(12) United States Patent
Nakahori

(10) Patent No.: US 9,768,699 B2
(45) Date of Patent: Sep. 19, 2017

(54) SWITCHING POWER SUPPLY UNIT

(71) Applicant: TDK CORPORATION, Tokyo (JP)

(72) Inventor: Wataru Nakahori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/164,347

(22) Filed: May 25, 2016

(65) Prior Publication Data

US 2016/0365793 A1 Dec. 15, 2016

(30) Foreign Application Priority Data

Jun. 12, 2015 (JP) ................. 2015-119010

(51) Int. Cl.
*H02M 3/335* (2006.01)
*H02M 1/08* (2006.01)
*H02M 3/28* (2006.01)

(52) U.S. Cl.
CPC ......... *H02M 3/33507* (2013.01); *H02M 1/08* (2013.01); *H02M 3/285* (2013.01); *H02M 3/33569* (2013.01)

(58) Field of Classification Search
CPC .... H02M 1/08; H02M 3/33507; H02M 3/285; H02M 3/33569
See application file for complete search history.

(56) References Cited

U.S. PATENT DOCUMENTS

| 5,576,940 | A | * | 11/1996 | Steigerwald | ............ | H02J 1/102 |
| | | | | | | 363/17 |
| 5,654,880 | A | * | 8/1997 | Brkovic | .............. | H02M 1/4258 |
| | | | | | | 363/132 |
| 5,991,171 | A | * | 11/1999 | Cheng | ............... | H02M 3/33507 |
| | | | | | | 363/21.03 |
| 6,222,744 | B1 | * | 4/2001 | Pernyeszi | ............ | H02M 7/538 |
| | | | | | | 363/41 |
| 8,780,585 | B2 | | 7/2014 | Ye | | |
| 9,318,945 | B2 | * | 4/2016 | Worek | .................. | H02M 3/335 |
| 9,490,709 | B2 | * | 11/2016 | Lee | ..................... | H02M 3/33507 |
| 9,570,991 | B2 | * | 2/2017 | Akutagawa | ....... | H02M 3/33584 |
| 2006/0245222 | A1 | * | 11/2006 | Nojima | .................... | H02M 1/32 |
| | | | | | | 363/132 |
| 2009/0196072 | A1 | * | 8/2009 | Ye | ........................ | H02M 7/493 |
| | | | | | | 363/17 |
| 2014/0009093 | A1 | * | 1/2014 | Suzuki | ................ | H02P 21/0096 |
| | | | | | | 318/400.02 |

* cited by examiner

*Primary Examiner* — Fred E Finch, III
*Assistant Examiner* — Demetries A Gibson
(74) *Attorney, Agent, or Firm* — Oliff PLC

(57) ABSTRACT

Provided is a switching power supply unit that includes a pair of input terminals, a pair of output terminals, two transformers, two inverter circuits, a rectifying smoothing circuit, and a driver. The rectifying smoothing circuit includes eight rectifying devices, a first choke coil, a second choke coil, and a capacitance. In the rectifying smoothing circuit, two full-bridge rectifying circuits are provided that each include a first arm and a second arm. The first arm and the second arm each have two of the eight rectifying devices. Secondary windings of the respective two transformers are each coupled to corresponding one of the two full-bridge rectifying circuits to form an H-bridge coupling. Coupling relation of the first arm, the second arm, the first choke coil, the second choke coil, and the capacitance is appropriately defined.

8 Claims, 15 Drawing Sheets

SWITCHING POWER SUPPLY UNIT

CROSS REFERENCE TO RELATED APPLICATIONS

This application claims the benefit of Japanese Priority Patent Application JP2015-119010 filed on Jun. 12, 2015, the entire contents of which are incorporated herein by reference.

BACKGROUND

The invention relates to a switching power supply unit that performs voltage conversion with use of one or more switching devices.

As some examples of a switching power supply unit, various DC-DC converters have been proposed and put into practical use (for example, refer to United States Unexamined Patent Application Publication No. 2009/0196072 and U.S. Pat. No. 8,780,585). This kind of DC-DC converter generally includes an inverter circuit including switching devices, a power conversion transformer (or a transformer element), and a rectifying smoothing circuit.

SUMMARY

In a switching power supply unit such as the DC-DC converter, enhancement in power conversion efficiency has been pursued in general.

It is desirable to provide a switching power supply unit that makes it possible to facilitate enhancement in power conversion efficiency.

A switching power supply unit according to an illustrative embodiment of the invention includes a pair of input terminals, a pair of output terminals, two transformers, two inverter circuits, a rectifying smoothing circuit, and a driver. The pair of input terminals is configured to receive an input voltage. The pair of output terminals is configured to output an output voltage. The two transformers each have a primary winding and a secondary winding. The two inverter circuits are provided in parallel to one another between the pair of input terminals and the primary windings, and each have one or more switching devices. The rectifying smoothing circuit is provided between the pair of output terminals and the secondary windings, and includes eight rectifying devices, a first choke coil, a second choke coil, and a capacitance provided between the pair of output terminals. The driver is configured to perform a switching drive that controls operation of the one or more switching devices of the respective two inverter circuits. In the rectifying smoothing circuit, two full-bridge rectifying circuits are provided that each include two arms, in which the two arms each have two of the eight rectifying devices that are provided in series to one another in a same direction. The secondary windings of the respective two transformers are each coupled to corresponding one of the two full-bridge rectifying circuits to form an H-bridge coupling to the corresponding one of the two full-bridge rectifying circuits. A first connection point is coupled to a first end of the first choke coil and a second connection point is coupled to a first end of the second choke coil, in which the first connection point is a connection point that couples together first ends of respective first arms, the second connection point is a connection point that couples together first ends of respective second arms, in which the first arms each are an arm that is corresponding one of the two arms in each of the two full-bridge rectifying circuits, and the second arms each are an arm that is corresponding another one of the two arms in each of the two full-bridge rectifying circuits. A third connection point is coupled to a first end of the capacitance, in which the third connection point is a connection point that couples together second ends of the respective first and second choke coils. A fourth connection point and a fifth connection point are coupled to a second end of the capacitance, in which the fourth connection point is a connection point that couples together second ends of the respective first arms in the respective two full-bridge rectifying circuits, and the fifth connection point is a connection point that couples together second ends of the respective second arms in the respective two full-bridge rectifying circuits.

According to the switching power supply unit of the illustrative embodiment of the invention, it is possible to facilitate enhancement in power conversion efficiency.

It is to be understood that both the foregoing general description and the following detailed description are exemplary, and are intended to provide further explanation of the invention as claimed. Also, effects of the invention are not limited to those described above. Effects achieved by the invention may be those that are different from the above-described effects, or may include other effects in addition to those described above.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the invention.

DETAILED DESCRIPTION

Figure 1:
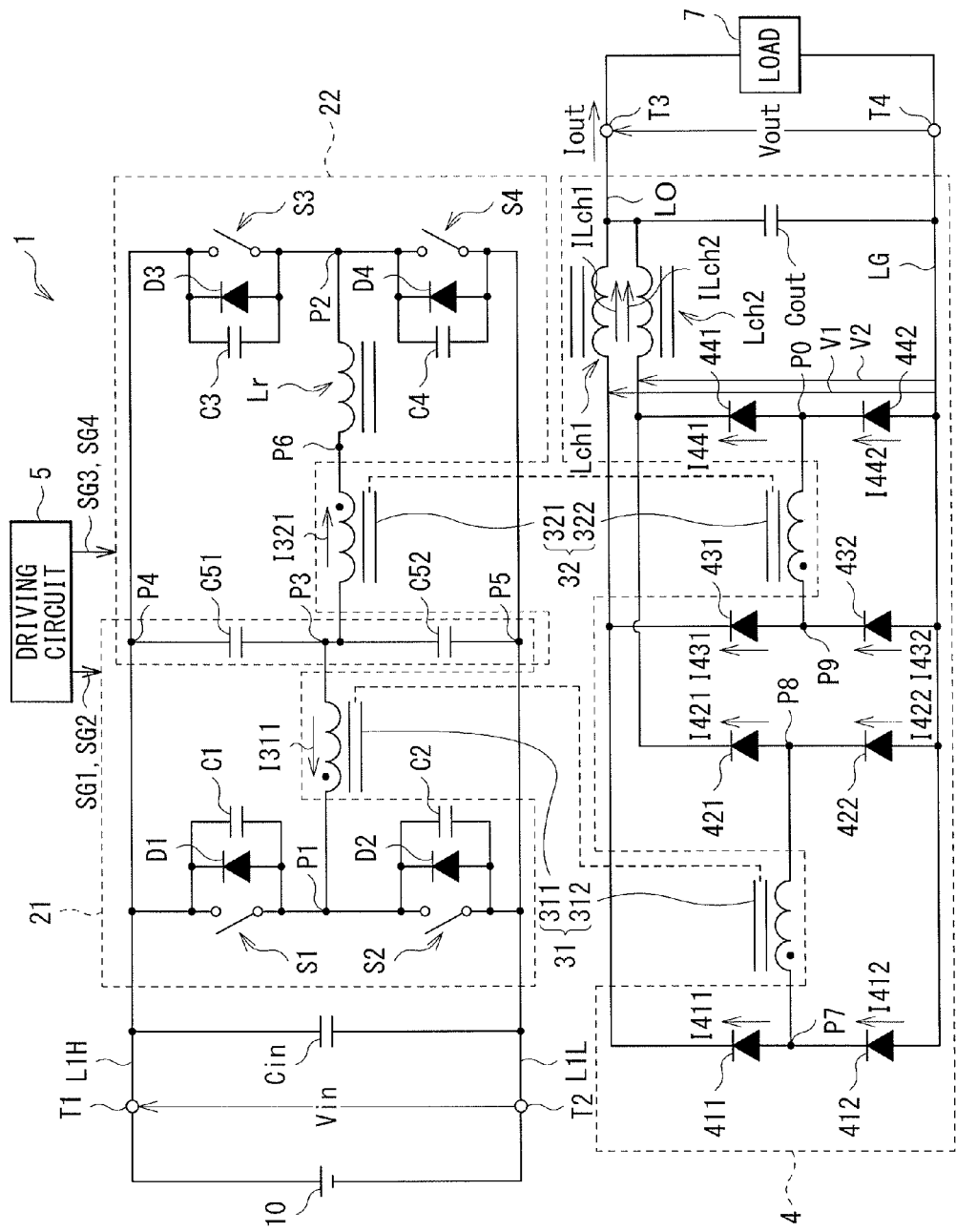
FIG. 1 is a circuit diagram of an example of an overall configuration of a switching power supply unit according to an example embodiment of the invention.

In the following, some example embodiments of the invention are described in detail with reference to the accompanying drawings. It is to be noted that the following description and the accompanying drawings are directed to illustrative examples of the invention and not to be construed as limiting to the invention. The description is given in the following order.
1. Example Embodiment (an example in which each of inverter circuits includes a half-bridge circuit)
2. Modification Examples
   Modification Example 1 (an example in which each of inverter circuits includes a full-bridge circuit)
   Modification Example 2 (an example in which capacitors adapted to prevent biased excitation are provided inside inverter circuits)
   Modification Example 3 (an example in which rectifying devices that may serve as reverse voltage clamps are provided inside inverter circuits)
   Modification Example 4 (another example of a configuration of a rectifying smoothing circuit)
3. Other Modification Examples 1. Example Embodiment Configuration FIG. 1 illustrates, in a form of a circuit diagram, an example of an overall configuration of a switching power supply unit (a switching power supply unit 1) according to an example embodiment of the invention. The switching power supply unit 1 may function as a DC-DC converter that performs voltage conversion of a direct-current input voltage Vin supplied from a battery 10 (a first battery) to a direct-current output voltage Vout, and supplies the direct-current output voltage Vout to an undepicted second battery to drive a load 7. Here, the voltage conversion in the switching power supply unit 1 may take either form of up-conversion (voltage boosting) or down-conversion (voltage dropping). It is to be noted that the direct-current input voltage Vin corresponds to one specific but non-limiting example of an "input voltage" of one embodiment of the invention, and the direct-current output voltage Vout corresponds to one specific but non-limiting example of an "output voltage" of one embodiment of the invention.

The switching power supply unit 1 may include two input terminals T1 and T2, two output terminals T3 and T4, an input smoothing capacitor Cin, two inverter circuits 21 and 22, two transformers 31 and 32, a rectifying smoothing circuit 4, and a driving circuit 5. The direct-current input voltage Vin may be inputted to between the input terminals T1 and T2. The direct-current output voltage Vout may be outputted from between the output terminals T3 and T4. It is to be noted that the input terminals T1 and T2 correspond to one specific but non-limiting example of a "pair of input terminals" of one embodiment of the invention, and the output terminals T3 and T4 correspond to one specific but non-limiting example of a "pair of output terminals" of one embodiment of the invention.

The input smoothing capacitor Cin may be disposed between a primary high-voltage line L1H and a primary low-voltage line L1L. The primary high-voltage line L1H may be coupled to the input terminal T1, while the primary low-voltage line L1L may be coupled to the input terminal T2. In one specific but non-limiting example, a first end of the input smoothing capacitor Cin may be coupled to the primary high-voltage line L1H, at a position between the two inverter circuits 21 and 22, and the input terminal T1. A second end of the input smoothing capacitor Cin may be coupled to the primary low-voltage line L1L, at a position between the two inverter circuits 21 and 22, and the input terminal T2. The input smoothing capacitor Cin may be a capacitor adapted to smooth the direct-current input voltage Vin inputted from the input terminals T1 and T2. It is to be noted that in the example of the circuit configuration illustrated in FIG. 1, two capacitors C51 and C52 inside the inverter circuits 21 and 22 to be described later may also function as input smoothing capacitors. The input smoothing capacitor Cin may be therefore eliminated.

(Inverter Circuits 21 and 22)

The inverter circuits 21 and 22 are provided in parallel to one another between the input terminals T1 and T2, and primary windings 311 and 321 in the respective transformers 31 and 32 to be described later. Each of the inverter circuits 21 and 22 may include a half-bridge circuit including two switching devices.

In one specific but non-limiting example, the inverter circuit 21 may include two switching devices S1 and S2, capacitors C1 and C2, diodes D1 and D2, and two capacitors C51 and C52. The capacitors C1 and C2, and the diodes D1 and D2 may be respectively coupled in parallel to the switching devices S1 and S2. The inverter circuit 22 may include two switching devices S3 and S4, capacitors C3 and C4, diodes D3 and D4, the two capacitors C51 and C52, and a resonance inductor Lr. That is, the capacitors C51 and C52 may be devices shared by the inverter circuits 21 and 22. The capacitors C3 and C4, and the diodes D3 and D4 may be respectively coupled in parallel to the switching devices S3 and S4. It is to be noted that the diodes D1 to D4 each may include a cathode disposed on primary high-voltage line L1H side, and an anode disposed on primary low-voltage line L1L side. In other words, the diodes D1 to D4 may be in a backward-coupled state.

In the inverter circuit 21, first ends of the switching devices S1 and S2, first ends of the capacitors C1 and C2, the anode of the diode D1, and the cathode of the diode D2 may be coupled together at a connection point P1. First ends of the capacitors C51 and C52 may be coupled together at a connection point P3. A second end of the switching device S1, a second end of the capacitor C1, the cathode of the diode D1, and a second end of the capacitor C51 may be coupled together at a connection point P4 on the primary high-voltage line L1H. A second end of the switching device S2, a second end of the capacitor C2, the anode of the diode D2, and a second end of the capacitor C52 may be coupled together at a connection point P5 on the primary low-voltage line L1L. Between the connection points P1 and P3, the primary winding 311 of the transformer 31 to be described later may be inserted. With this configuration, in the inverter circuit 21, the switching devices S1 and S2 may be respectively turned on and off in accordance with to drive signals SG1 and SG2 supplied from the driving circuit 5 to be described later. This allows the direct-current input voltage Vin applied to between the input terminals T1 and T2 to be converted to an alternating-current voltage, and the alternating-current voltage thus converted may be outputted to the transformer 31.

In the inverter circuit 22, first ends of the switching devices S3 and S4, first ends of the capacitors C3 and C4, the anode of the diode D3, and the cathode of the diode d4 may be coupled together at a connection point P2. A second end of the switching device S3, a second end of the capacitor C3, the cathode of the diode D3, and the second end of the capacitor C51 may be coupled together at the connection point P4 as mentioned above. A second end of the switching device S4, a second end of the capacitor C4, the anode of the diode D4, and the second end of the capacitor C52 may be coupled together at the connection point P5 as mentioned above. Between the connection points P3 and P2, the primary winding 321 of the transformer 32 to be described later and the resonance inductor Lr may be inserted in a serially-coupled state. In one specific but non-limiting example, a first end of the primary winding 321 may be coupled to the connection point P3; a second end of the primary winding 321 and a first end of the resonance inductor Lr may be coupled together at a connection point P6; and a second end of the resonance inductor Lr may be coupled to the connection point P2. With this configuration, in the inverter circuit 22 as well, the switching devices S3 and S4 may be respectively turned on and off in accordance with drive signals SG3 and SG4 supplied from the driving circuit 5 to be described later. This allows the direct-current input voltage Vin to be converted to an alternating-current voltage, and the alternating-current voltage thus converted may be outputted to the transformer 32.

It is to be noted that non-limiting examples of switching devices used as the switching devices S1 to S4 may include field effect transistors (MOS-FETs or Metal Oxide Semiconductor-Field Effect Transistors) and IGBTs (Insulated Gate Bipolar Transistors). With MOS-FETs used as the switching devices S1 to S4, the capacitors C1 to C4 and the diodes D1 to D4 may be configured of parasitic capacitances and parasitic diodes of the respective MOS-FETs. In another alternative, the capacitors C1 to C4 may be configured of junction capacitances of the respective diodes D1 to D4. With such configurations, it is not necessary to provide the capacitors C1 to C4 and the diodes D1 to D4 separately from the switching devices S1 to S4. This allows for simplification of the circuit configuration of the inverter circuits 21 and 22.

(Transformers 31 and 32)

The transformer 31 includes the primary winding 311 and a secondary winding 312. The primary winding 311 may include a first end coupled to the first connection point P1, and a second end coupled to the connection point P3. The secondary winding 312 may include a first end coupled to a connection point P7 inside the rectifying smoothing circuit 4 to be described later, and a second end coupled to a connection point P8 inside the rectifying smoothing circuit 4. The transformer 31 is adapted to perform voltage conversion of the alternating-current voltage generated by the inverter circuit 21 (i.e., the alternating-current voltage inputted to the transformer 31), and to output the alternating-current voltage thus voltage-converted, from an end of the secondary winding 312. It is to be noted that a degree of the voltage conversion in this case may be determined by a ratio of the numbers of winding turns of the primary winding 311 and the secondary winding 312.

Similarly, the transformer 32 includes the primary winding 321 and a secondary winding 322. The primary winding 321 may include a first end coupled to the connection point P3, and a second end coupled to the connection point P6. The secondary winding 322 may include a first end coupled to a connection point P9 inside the rectifying smoothing circuit 4 to be described later, and a second end coupled to a connection point P0 inside the rectifying smoothing circuit 4. The transformer 32 is adapted to perform voltage conversion of the alternating-current voltage generated by the inverter circuit 22 (i.e., the alternating-current voltage inputted to the transformer 32), and to output the alternating-current voltage thus voltage-converted from an end of the secondary winding 322. It is to be noted that a degree of the voltage conversion in this case may be also determined by a ratio of the numbers of winding turns of the primary winding 321 and the secondary winding 322.

(Rectifying Smoothing Circuit 4)

The rectifying smoothing circuit 4 is provided between the secondary windings 312 and 322 in the transformers 31 and 32, and the output terminals T3 and T4. The rectifying smoothing circuit 4 may include eight rectifying diodes 411, 412, 421, 422, 431, 432, 441, and 442, two choke coils Lch1 and Lch2, and one output smoothing capacitor Cout. It is to be noted that the rectifying diodes 411, 412, 421, 422, 431, 432, 441, and 442 each correspond to one specific but non-limiting example of a "rectifying device" of one embodiment of the invention. The output smoothing capacitor Cout corresponds to one specific but non-limiting example of a "capacitance" of one embodiment of the invention. The choke coil Lch1 corresponds to one specific but non-limiting example of a "first choke coil" of one embodiment of the invention. The choke coil Lch2 corresponds to one specific but non-limiting example of a "second choke coil" of one embodiment of the invention.

In the rectifying smoothing circuit 4, two full-bridge rectifying circuits may be provided. Each of the two full-bridge rectifying circuits may include two arms each of which may include two of the eight rectifying diodes provided in series to one another in a same direction. In one specific but non-limiting example, a left-side arm (a first arm) including the rectifying diodes 411 and 412, and a right-side arm (a second arm) including the rectifying diodes 421 and 422 may constitute a first full-bridge rectifying circuit. Similarly, a left-side arm (a first arm) including the rectifying diodes 431 and 432, and a right-side arm (a second arm) including the rectifying diodes 441 and 442 may constitute a second full-bridge rectifying circuit.

The first and the second full-bridge rectifying circuits may be provided in parallel to one another between the output terminals T3 and T4. In one specific but non-limiting example, a connection point of first ends of the first arms in the first and the second full-bridge rectifying circuits may be coupled to a first end of the choke coil Lch1 disposed on an output line LO from the output terminal T3. A connection point of second ends of the first arms may be coupled to a ground line LG extended from the output terminal T4. A connection point of first ends of the second arms in the first and the second full-bridge rectifying circuits may be coupled to a first end of the choke coil Lch2 disposed on the output line LO from the output terminal T3. A connection point of second ends of the second arms may be coupled to the ground line LG.

Here, in the first arm in the first full-bridge rectifying circuit, cathodes of the rectifying diodes 411 and 412 may be disposed on side on which the first end of the first arm is disposed. Anodes of the rectifying diodes 411 and 412 may be disposed on side on which the second end of the first arm is disposed. In one specific but non-limiting example, the cathode of the rectifying diode 411 may be coupled to side of the choke coil Lch1 on which the first end of the first arm is disposed. The anode of the rectifying diode 411 and the cathode of the rectifying diode 412 may be coupled together at the connection point P7. The anode of the rectifying diode 412 may be coupled to the ground line LG. Meanwhile, in the second arm in the first full-bridge rectifying circuit, cathodes of the rectifying diodes 421 and 422 may be disposed on side on which the first end of the second arm is disposed. Anodes of the rectifying diodes 421 and 422 may be disposed on side on which the second end of the second arm is disposed. In one specific but non-limiting example, the cathode of the rectifying diode 421 may be coupled to side of the choke coil Lch2 on which the first end of the second arm is disposed. The anode of the rectifying diode 421 and the cathode of the rectifying diode 422 may be coupled together at the connection point P8. The anode of the rectifying diode 422 may be coupled to the ground line LG.

Similarly, in the first arm in the second full-bridge rectifying circuit, cathodes of the rectifying diodes 431 and 432 may be disposed on side on which the first end of the first arm is disposed. Anodes of the rectifying diodes 431 and 432 may be disposed on side on which the second end of the first arm is disposed. In one specific but non-limiting example, the cathode of the rectifying diode 431 may be coupled to side of the choke coil Lch1 on which the first end of the first arm is disposed. The anode of the rectifying diode 431 and the cathode of the rectifying diode 432 may be coupled together at the connection point P9. The anode of the rectifying diode 432 may be coupled to the ground line LG. Meanwhile, in the second arm in the second full-bridge rectifying circuit, cathodes of the rectifying diodes 441 and 442 may be disposed on side on which the first end of the second arm is disposed. Anodes of the rectifying diodes 441 and 442 may be disposed on side on which the second end of the second arm is disposed. In one specific but non-limiting example, the cathode of the rectifying diode 441 may be coupled to side of the choke coil Lch2 on which the first end of the second arm is disposed. The anode of the rectifying diode 441 and the cathode of the rectifying diode 442 may be coupled together at the connection point P0. The anode of the rectifying diode 442 may be coupled to the ground line LG.

Moreover, the secondary windings 312 and 322 in the respective transformers 31 and 32 each may be coupled to corresponding one of the first and the second full-bridge rectifying circuits to form an H-bridge coupling to the corresponding one of the first and the second full-bridge rectifying circuits. In one specific but non-limiting example, the secondary winding 312 of the transformer 31 may be coupled to the first full-bridge rectifying circuit to form the H-bridge coupling to the first full-bridge rectifying circuit. Also, the secondary winding 322 of the transformer 32 may be coupled to the second full-bridge rectifying circuit to form the H-bridge coupling to the second full-bridge rectifying circuit. In one more specific but non-limiting example, the secondary winding 312 may be inserted between the connection points P7 and P8 in the first full-bridge rectifying circuit, while the secondary winding 322 may be inserted between the connection points P9 and P10 in the second full-bridge rectifying circuit.

Furthermore, a connection point of second ends of the choke coils Lch1 and Lch2 may be coupled to a first end of the output smoothing capacitor Cout. In the first and the second full-bridge rectifying circuits, the connection point of the second ends of the first arms and the connection point of the second ends of the second arms each may be coupled to a second end of the output smoothing capacitor Cout, on the ground line LG.

In the rectifying smoothing circuit 4 as configured above, in the first and the second full-bridge rectifying circuits, the alternating-current voltages outputted from the transformers 31 and 32 may be rectified, and the voltages thus rectified may be outputted. Moreover, in a smoothing circuit constituted by the choke coils Lch1 and Lch2 and the output smoothing capacitor Cout, the voltages rectified by the first and the second full-bridge rectifying circuits may be smoothed to generate a direct-current output voltage Vout. It is to be noted that the direct-current output voltage Vout thus generated may be outputted from the output terminals T3 and T4 to the second battery (not illustrated) for electric power supply.

(Driving Circuit 5)

The driving circuit 5 may be a circuit configured to perform a switching drive to control operation of the switching devices S1 to S4 inside the inverter circuits 21 and 22. In one specific but non-limiting example, the driving circuit 5 may supply the switching devices S1 to A4 with the respective drive signals SG1 to SG4, thereby control each of the switching devices S1 to S4 to be turned on and off.

Here, in the example embodiment, the driving circuit 5 may perform the switching drive to allow the two inverter circuits 21 and 22 to operate with a phase difference (a phase difference $\phi$ to be described later). In other words, the driving circuit 5 may perform a switching phase control on the switching devices S1 to S4, and may set the phase difference appropriately to stabilize the direct-current output voltage Vout. Moreover, at this occasion, for example, the driving circuit 5 may perform the switching drive, although details of which is to be given later, to allow durations of on-duty periods of the switching devices S1 to S4 to be substantially maximum (or to be maximum in a preferred but non-limiting example), in the inverter circuits 21 and 22. It is to be noted that the driving circuit 5 corresponds to one specific but non-limiting example of a "driver" of one embodiment of the invention.

[Operation, Workings, and Effects]

(A. Overall Operation)

In the switching power supply unit 1, in the inverter circuits 21 and 22, the direct-current input voltage Vin supplied from the input terminals T1 and T2 may be switched to generate the alternating-current voltages. The alternating-current voltages may be supplied to the primary windings 311 and 321 in the transformers 31 and 32. In the transformers 31 and 32, the alternating-current voltages may be converted. The alternating-current voltages thus converted may be outputted from the secondary windings 312 and 322.

In the rectifying smoothing circuit 4, the alternating-current voltages outputted from the transformers 31 and 32 (i.e., the voltage-converted alternating-current voltages) may be rectified by the rectifying diodes 411, 412, 421, 422, 431, 432, 441, and 442. Thereafter, the alternating-current voltages thus rectified may be smoothed by the choke coils Lch1 and Lch2, and the output smoothing capacitor Cout. Thus, the direct-current output voltage Vout may be outputted from the output terminals T3 and T4. The direct-current output voltage Vout may be supplied to the undepicted second battery to be used for charging of the second battery while driving the load 7.

(B. Detailed Operation)

Description is given next, with reference to FIGS. 2 to 10, on detailed operation of the switching power supply unit 1.

Figure 2:
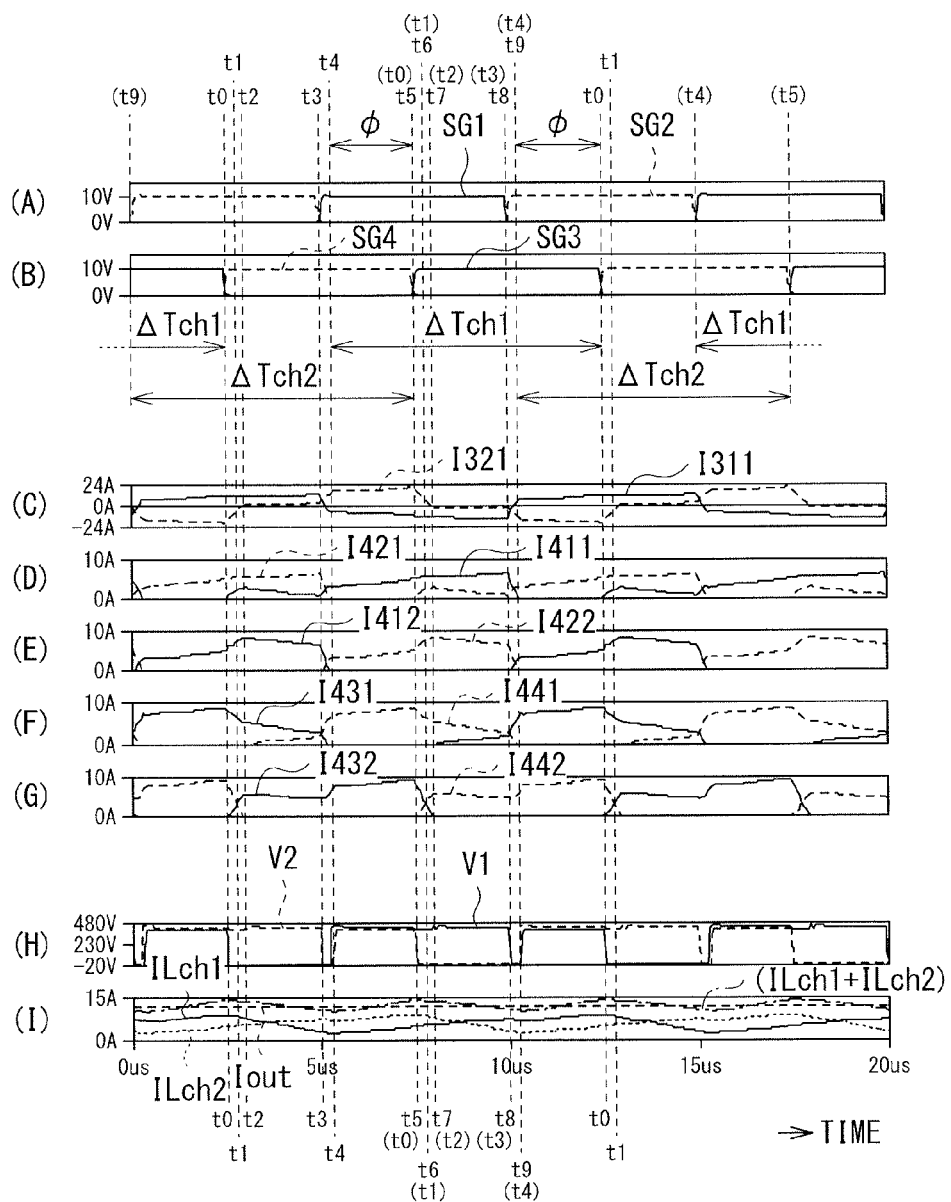
FIG. 2 is a timing waveform chart of an example of operation of the switching power supply unit illustrated in FIG. 1.

FIG. 2 illustrates, in a form of a timing waveform chart, a voltage waveform or a current waveform of each section in the switching power supply unit 1. Specifically, (A) and (B) of FIG. 2 illustrate voltage waveforms of the drive signals SG1 to SG4. (C) to (G) of FIG. 2 illustrate current waveforms of currents I311 and I321 respectively flowing through the primary windings 311 and 321, and currents I411, I412, I421, I422, I431 I432 I441, and I442 respectively flowing through the rectifying diodes 411, 412, 421, 422, 431, 432, 441, and 442, as illustrated in FIG. 1. (H) of FIG. 2 illustrates voltage waveforms of a voltage V1 applied to between the first end of the choke coil Lch1 and the ground line LG, and a voltage V2 applied to between the first end of the choke coil Lch2 and the ground line LG, as illustrated in FIG. 1. (I) of FIG. 2 illustrates current waveforms of a current ILch1 flowing through the choke coil Lch1, a current ILch2 flowing through the choke coil Lch2, a current (ILch1+ILch2) that is a sum of the currents ILch1 and ILch2, and an output current Iout, as illustrated in FIG. 1. It is to be noted that positive directions of the voltages and the currents may be denoted by arrows in FIG. 1.

FIGS. 3 to 10 each schematically illustrate, in a form of a circuit diagram, an operation state of the switching power supply unit 1 at each of timings (timings t0 to t5) illustrated in FIG. 2. It is to be noted that in the operation as illustrated in FIG. 2, operation for the timings t0 to t5 (a first half cycle) and operation for the timings t5 to t0 (a latter half cycle) may be combined to form one-cycle operation.

(B-1. Operation for First Half Cycle)

Description is given first, with reference to FIGS. 2 to 10, on the operation for the first half cycle (the timings t0 to t5)

As to the drive signals SG1 to SG4 of the switching devices S1 to S4 ((A) and (B) of FIG. 2), it is as in the following. The switching devices S1 to S4 may be driven, in any state of switching operation, in a combination and at a timing where the input terminals T1 and T2 to which the direct-current input voltage Vin is applied are not electrically shortcircuited. In one specific but non-limiting example, the switching devices S3 and S4 are not turned on at same time. The switching devices S1 and S2 are not turned on at same time. A time interval taken to prevent them from being turned on at the same time may be called "dead time". The two inverter circuits 21 and 22 (that is, the switching devices S1 and S2, and the switching devices S3 and S4) may operate with the phase difference ϕ, for example, as illustrated in FIG. 2. In other words, the driving circuit 5 is configured to perform the switching phase control on the switching devices S1 to S4.

(Timings t0 to t2)

First, in a period before the timing t0, the switching devices S2 and S3 may be turned on, while the switching devices S1 and S4 may be turned off ((A) and (B) of FIG. 2). Next, in a period from the timing t0 to a timing t2, first, at the timing t0, the switching device S3 may be turned off ((B) of FIG. 2).

Figure 3:
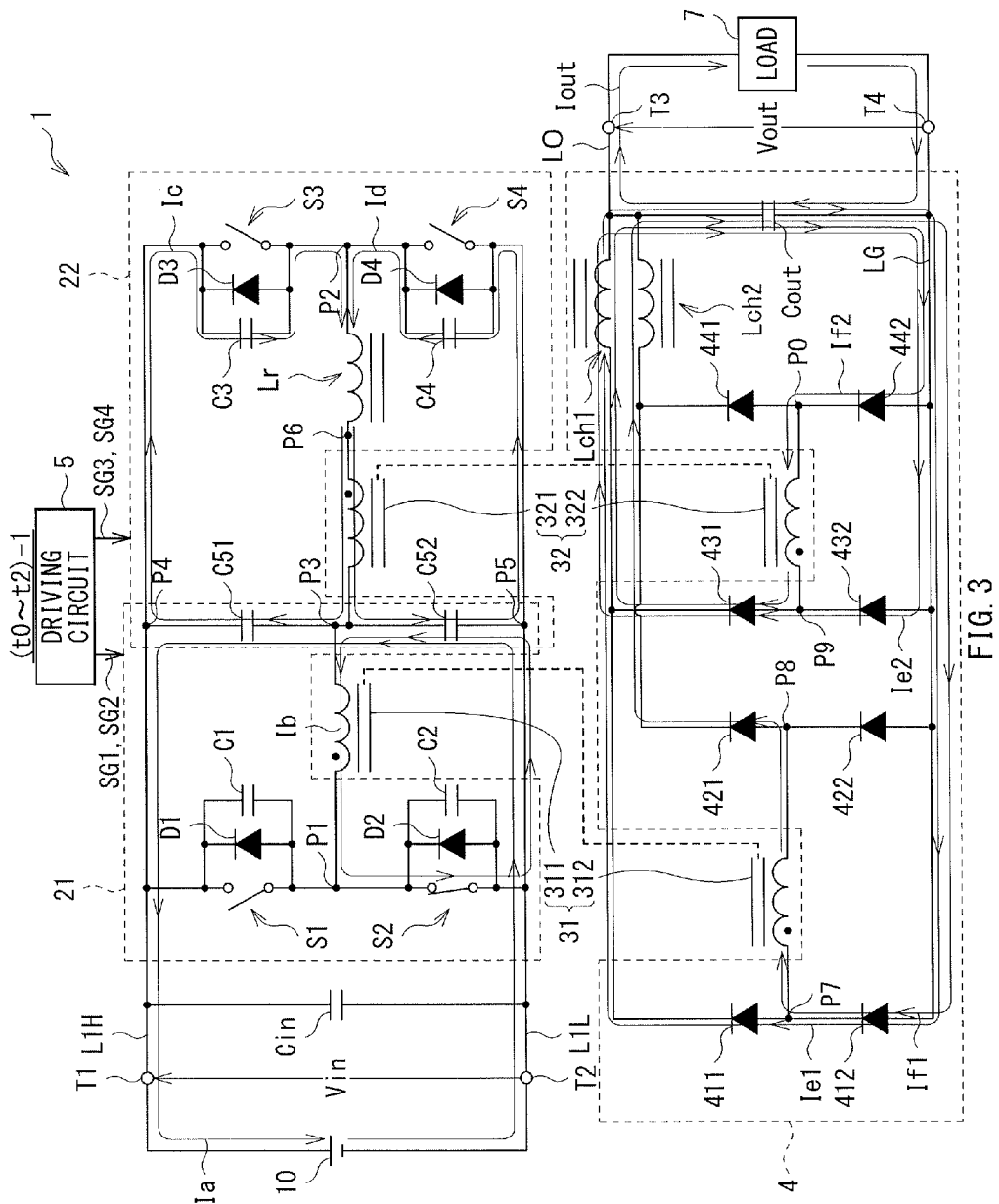
FIG. 3 is a circuit diagram of an example of an operation state of the switching power supply unit illustrated in FIG. 1.

Then, as illustrated in FIG. 3, on primary side (the inverter circuits 21 and 22) of the transformers 31 and 32, loop currents Ia, Ib, Ic, and Id may flow. In one specific but non-limiting example, the loop current Ia may flow circulatingly through the high-voltage battery 10, the input terminal T2, the capacitor C52, the capacitor C51, the input terminal T1, and the high-voltage battery 10 in the order named. The loop current Ib may flow circulatingly through the primary winding 311, the switching device S2, the capacitor C52, and the primary winding 311 in the order named. The loop current Ic may flow circulatingly through the resonance inductor Lr, the primary winding 321, the capacitor C51, the capacitor C3, and the resonance inductor Lr in the order named. The loop current Id may flow circulatingly through the resonance inductor Lr, the primary winding 321, the capacitor C52, the capacitor C4, and the resonance inductor Lr in the order named.

Among them, the loop currents Ic and Id (that correspond to "circulating currents" to be described later) may flow owing to energy stored in the resonance inductor Lr and leakage inductance (not illustrated) of the transformer 32, and may flow so as to maintain a preceding current direction. In other words, the resonance inductor Lr and the leakage inductance of the transformer 32 may work together with the capacitors C3, C4, C51, and C52 to constitute an LC resonance circuit whose LC resonance operation may cause such flows of the loop currents Ic and Id. The loop currents Ic and Id may allow the capacitor C3 to be charged, and may allow the capacitor C4 to discharge.

Meanwhile, on secondary side (the rectifying smoothing circuit 4) of the transformers 31 and 32, as illustrated in FIG. 3, loop currents Ie1, Ie2, If1, and If2, and the output current Iout may flow. The loop current Ie1 may flow circulatingly through the choke coil Lch1, the output smoothing capacitor Cout, the rectifying diode 412, the rectifying diode 411, and the choke coil Lch1 in the order named. The loop current Ie2 may flow circulatingly through the choke coil Lch1, the output smoothing capacitor Cout, the rectifying diode 432, the rectifying diode 431, and the choke coil Lch1 in the order named. The loop current If1 may flow circulatingly through the secondary winding 312, the choke coil Lch2, the output smoothing capacitor Cout, the rectifying diode 412, and the secondary winding 312 in the order named. The loop current If2 may flow circulatingly through the secondary winding 322, the rectifying diode 431, the choke coil Lch1, the output smoothing capacitor Cout, the rectifying diode 442, and the secondary winding 322 in the order named. The output current Iout may flow circulatingly through the output smoothing capacitor Cout, the output terminal T3, the load 7, the output terminal t4, and the output smoothing capacitor Cout in the order named, thereby allowing the load 7 to be driven.

In the period from the timing t0 to the timing t2, thereafter, when a voltage between both ends of the switching device S3 reaches Vin (becomes equal to Vin (=Vin)), and a voltage between both ends of the switching device S4 reaches 0V (becomes equal to 0V (=0V)), that is, when a potential at the connection point P2 becomes equal to 0V (=0V), the following result arises.

Figure 4:
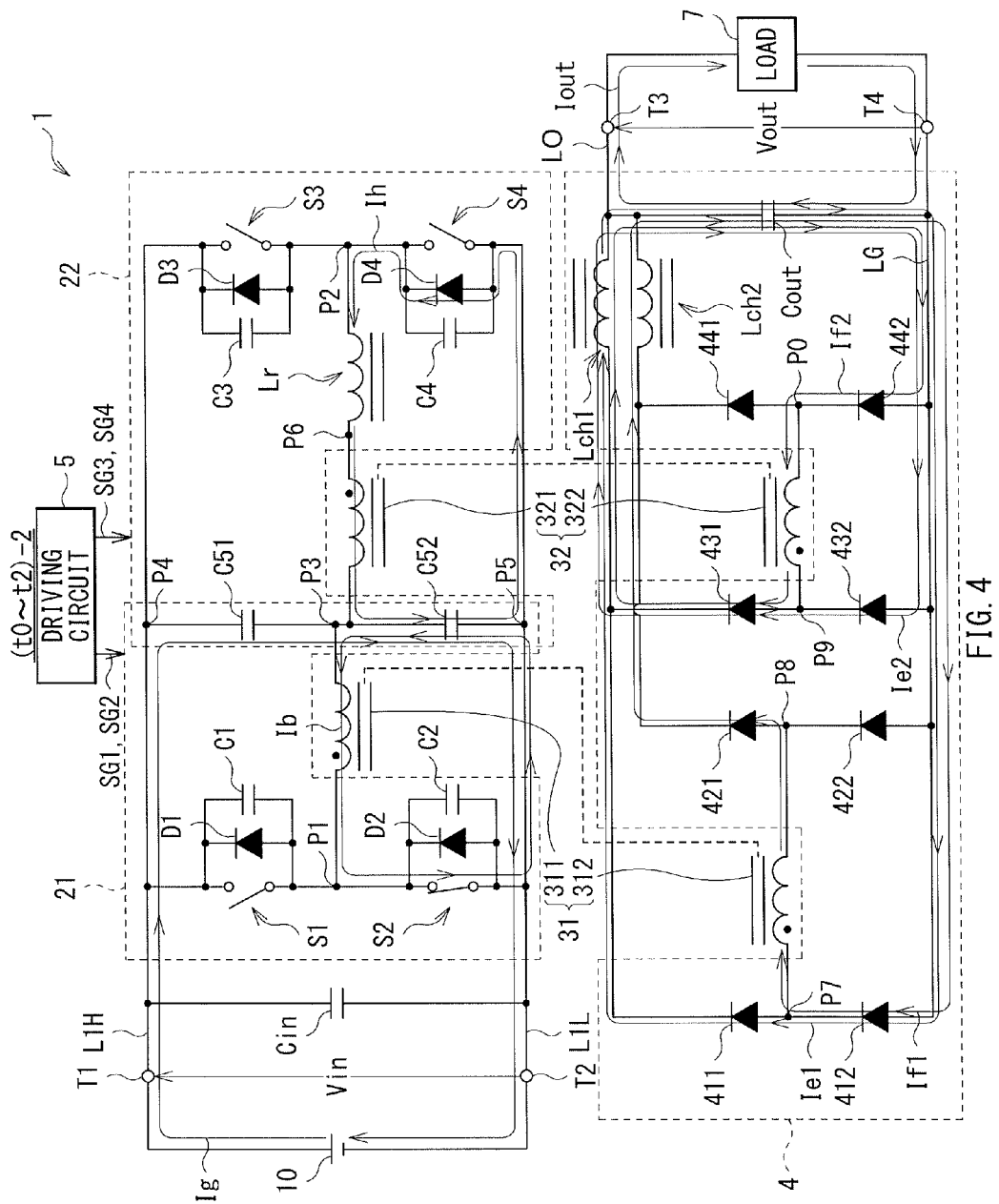
FIG. 4 is a circuit diagram of an example of an operation state following FIG. 3.

As illustrated in FIG. 4, the diode D4 as a body diode may become conductive. This causes a flow of a loop current Ih flowing through the diode D4, instead of the loop currents Ic and Id as illustrated in FIG. 3. In one specific but non-limiting example, the loop current Ih may flow circulatingly through the resonance inductor Lr, the primary winding 321, the capacitor C52, the diode D4, and the resonance inductor Lr in the order named.

It is to be noted that, at this occasion, on the primary side of the transformers 31 and 32, a loop current Ig as illustrated in FIG. 4 may flow, instead of the loop current Ia as illustrated in FIG. 3. In one specific but non-limiting example, the loop current Ig may flow circulatingly through the high-voltage battery 10, the input terminal T1, the capacitor C51, the capacitor C52, the input terminal T2, and the high-voltage battery 10 in the order named. Meanwhile, on the secondary side of the transformers 31 and 32, the loop currents Ie1, Ie2, If1, If2, and the output current Iout may keep on flowing. This allows the load 7 to be driven.

Figure 5:
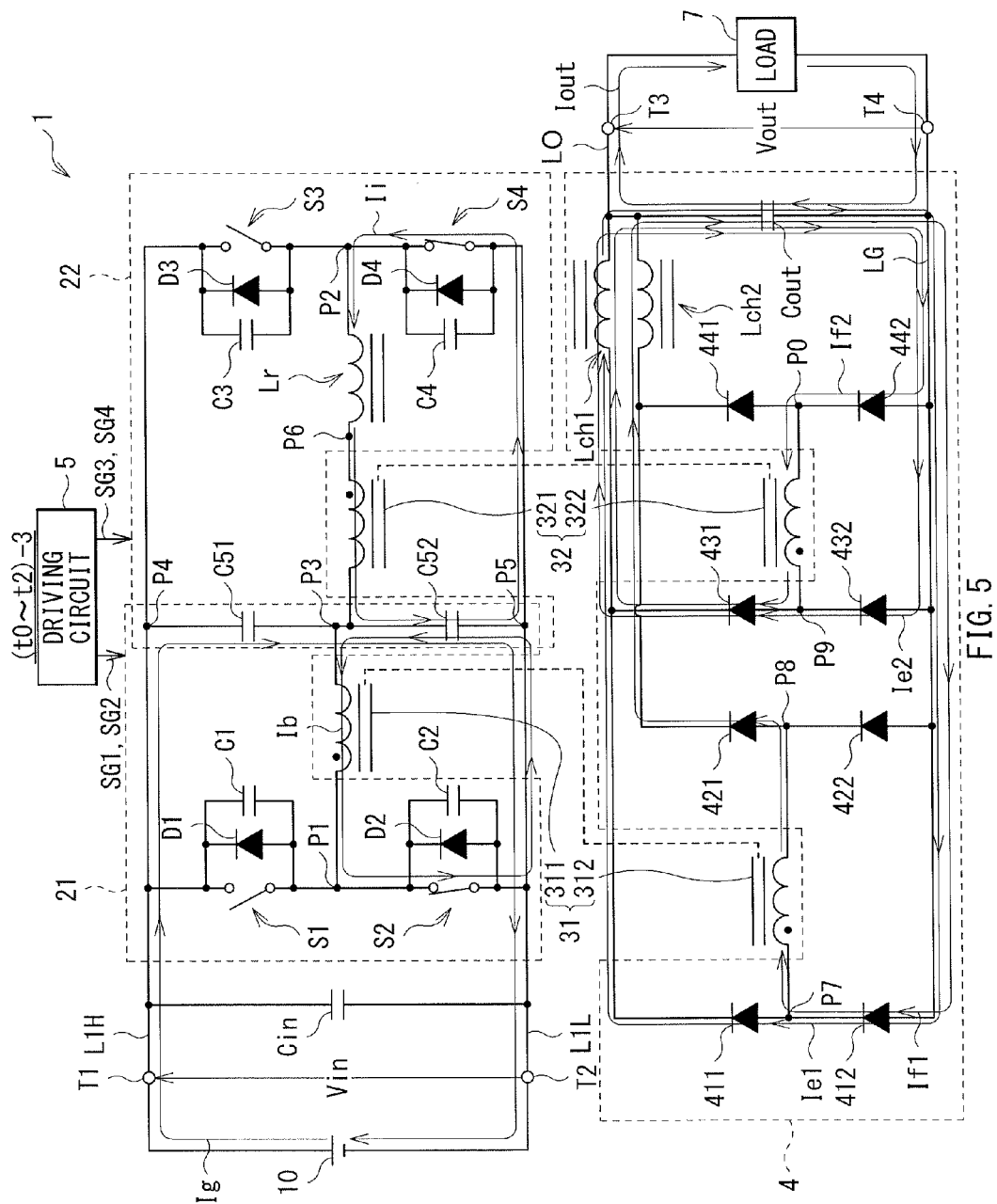
FIG. 5 is a circuit diagram of an example of an operation state following FIG. 4.

Subsequently, after the diode D4 becomes conductive as described, as illustrated in FIG. 5, the switching device S4 may be turned on ((B) of FIG. 2). This realizes ZVS (zero volt switching) operation, resulting in reduction in a loss (a switching loss) in the switching device S4. At this occasion, as illustrated in FIG. 5, a loop current Ii flowing through the switching device S4 may flow, instead of the loop current Ih as illustrated in FIG. 4. The loop current Ii may flow circulatingly through the resonance inductor Lr, the primary winding 321, the capacitor C52, the switching device S4, and the resonance inductor Lr in the order named. It is to be noted that an occasion on which such discharge of the energy stored in the resonance inductor Lr and the leakage inductance of the transformer 32 as described is finished may correspond to the timing t2 in FIG. 2.

(Timings t2 to t3)

Figure 6:
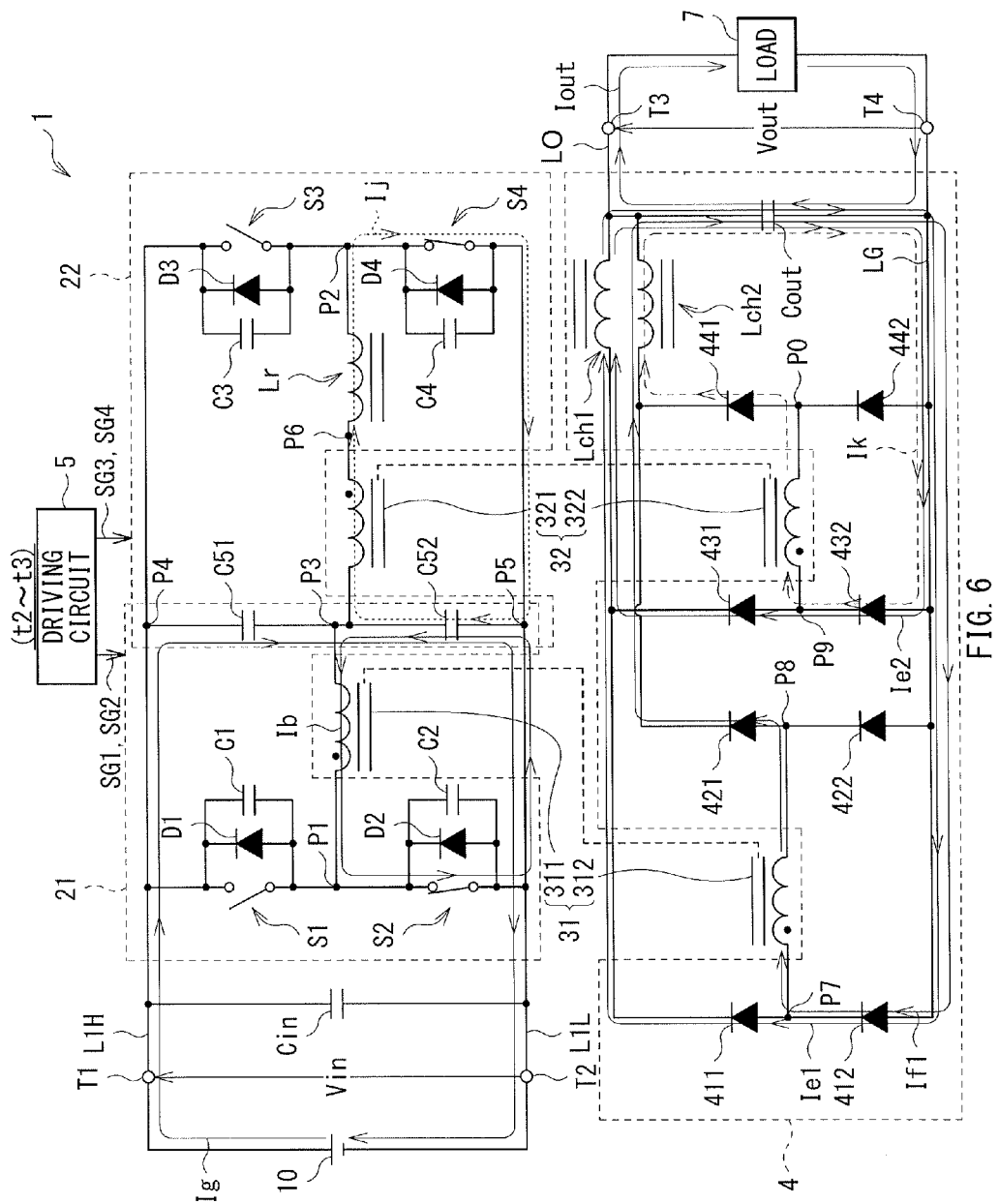
FIG. 6 is a circuit diagram of an example of an operation state following FIG. 5.

Next, as illustrated in FIG. 6, in a period from the timing t2 to a timing t3, it is as in the following. On the primary side of the transformers 31 and 32, a loop current Ij in an opposite direction to the loop current Ii as illustrated in FIG. 5 may flow. That is, the direction of the loop current may be reversed. The loop current Ij may flow circulatingly through the resonance inductor Lr, the switching device S4, the capacitor C52, the primary winding 321, and the resonance inductor Lr in the order named.

In accordance with the current reverse on the primary side, as illustrated in FIG. 6, on the secondary side of the transformers 31 and 32, a loop current Ik may flow, instead of the loop current If2 as described so far. The loop current Ik may flow circulatingly through the secondary winding 322, the rectifying diode 441, the choke coil Lch2, the output smoothing capacitor Cout, the rectifying diode 432, and the secondary winding 322 in the order named.

Here, the period from the timing t2 to the timing t3 may serve as a power transmission period from the primary side to the secondary side of the transformers 31 and 32. It is to be noted that a period from the timing t2 to the timing t5 to be described later may serve as a power transmission period with use of the transformer 32.

At this occasion, in the transformer 32, the primary winding 321 may be in a "H (High)" state on the connection point P3 side, and in an "L (Low)" state on the connection point P6 side. The secondary winding 322 may be in the "H" state on the connection point P0 side, and in the "L" state on the connection point P9 side. It follows, therefore, that a voltage |V322| given by (Vin/2)×(Ns2/Np2) may be generated between both ends of the secondary winding 322, in which the numbers of winding turns of the primary winding 321 and the secondary windings 322 in the transformer 32 are respectively defined as Np2 and Ns2.

In the meanwhile, in the transformer 31, the primary winding 311 may be in the "H" state on the connection point P3 side, and in the "L" state on the connection point P1 side. The secondary winding 312 may be in the "H" state on the connection point P8 side, and in the "L" state on the connection point P7 side. It follows, therefore, that a voltage IV3 121 given by (Vin/2)×(Ns1/Np1) may be generated between both ends of the secondary winding 312, in which the numbers of winding turns of the primary winding 311 and the secondary windings 312 in the transformer 31 are respectively defined as Np1 and Ns1.

The high and low states (the "H" state and the "L" state) at both ends of each of the secondary windings 312 and 322 may be as described above. Accordingly, in the period from the timing t2 to the timing t3, it is as in the following. The secondary windings 312 and 322 may be coupled in parallel to each other, i.e., in a two (2) parallel-coupled state. It follows, therefore, that the voltage V2 as described ((H) of FIG. 2) may be equal to |V312| and equal to |V322| (V2=|V312|=|V322|), and that the voltage V1 ((H) of FIG. 2) may be equal to 0V (V1=0V).

Before the period from the timing t2 to the timing t3, a current flowing through the choke coil Lch2 may be balanced with a current following through the secondary winding 312, with the transformer 31 in between. Also the leakage inductance of the secondary winding 312 may operate as an inductor (that is, may serve as a current source), and may be inclined to maintain the current flowing therethrough. It follows, therefore, that the current flowing through the choke coil Lch2 may flow mainly through the secondary winding 312 out of the secondary windings 312 and 322, even when the secondary windings 312 and 322 are coupled in parallel to each other in the period from the timing t2 to the timing t3. Accordingly, in FIG. 6, the loop current Ik flowing through the secondary winding 322 and the loop current Ij flowing through the corresponding primary winding 321 are denoted by broken lines for convenience.

(Timings t3 to t4)

Next, in a period from the timing t3 to a timing t4, first, at the timing t3, the switching device S2 may be turned off ((A) of FIG. 2).

Figure 7:
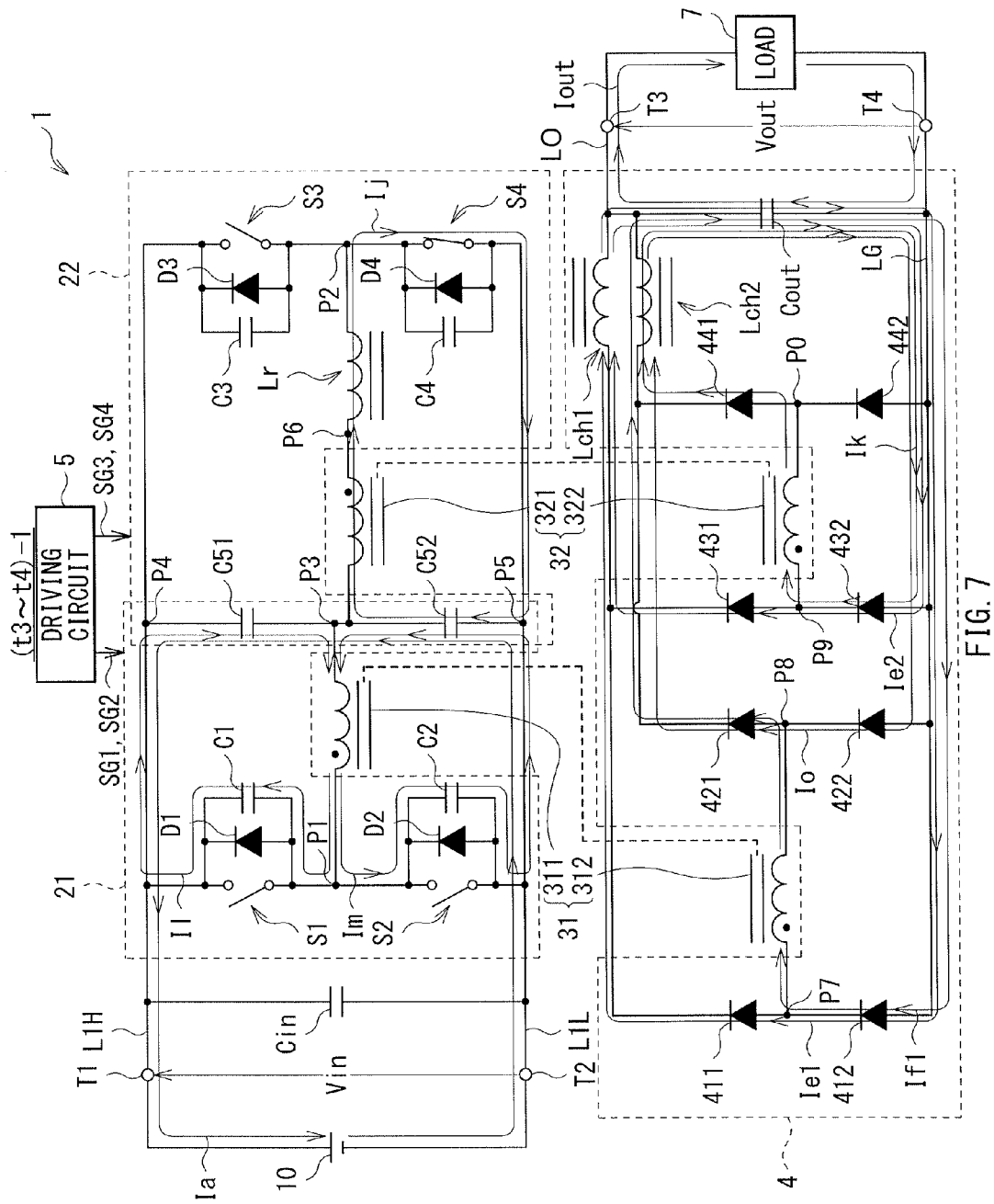
FIG. 7 is a circuit diagram of an example of an operation state following FIG. 6.

Then, as illustrated in FIG. 7, on the primary side of the transformers 31 and 32, loop currents Il and Im may flow, together with the loop currents Ia and Ij as described so far. In one specific but non-limiting example, the loop current Il may flow circulatingly through the primary winding 311, the capacitor C1, the capacitor C5, and the primary winding 311 in the order named. The loop current Im may flow circulatingly through the primary winding 311, the capacitor C2, the capacitor C52, and the primary winding 311 in the order named.

The loop currents Il and Im (that correspond to "circulating currents" to be described later) may flow owing to the energy stored in the leakage inductance (not illustrated) of the transformer 31, and may flow to maintain the preceding current direction. In other words, the leakage inductance of the transformer 31, and the capacitors C1, C2, C51, and C52 may work together to constitute an LC resonance circuit whose LC resonance operation may cause the loop currents Il and Im to flow. The loop currents Il and Im may allow the capacitor C2 to be charged, and may allow the capacitor C1 to discharge.

Meanwhile, on the secondary side of the transformers 31 and 32, as illustrated in FIG. 7, a loop current Io may flow, together with the loop currents Ie1, Ie2, If1, Ik, and the output current Iout as described so far. The loop current Io may flow circulatingly through the choke coil Lch2, the output smoothing capacitor Cout, the rectifying diode 422, the rectifying diode 421, and the choke coil Lch2 in the order named.

In the period from the timing t3 to the timing t4, thereafter, a voltage between both ends of the switching device S2 reaches Vin (becomes equal to Vin (=Vin)), and a voltage between both ends of the switching device S1 reaches 0V (becomes equal to 0V (=0V)), that is, a potential at the connection point P1 becomes equal to Vin (=Vin), leading to the following result.

Figure 8:
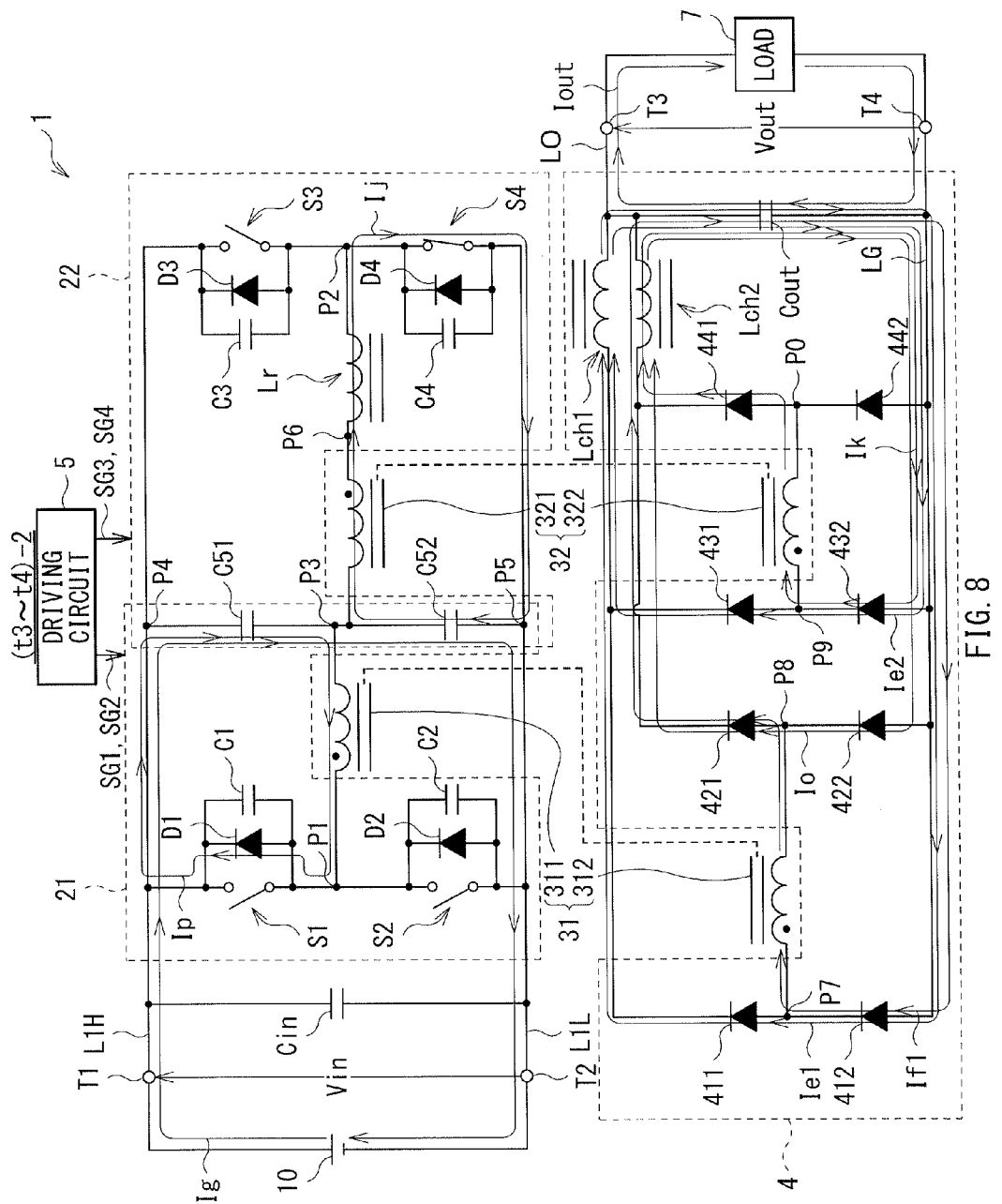
FIG. 8 is a circuit diagram of an example of an operation state following FIG. 7.

As illustrated in FIG. 8, the diode D1 as a body diode may become conductive. This causes a flow of a loop current Ip flowing through the diode D1, instead of the loop currents Il and Im as illustrated in FIG. 7. In one specific but non-limiting example, the loop current Ip may flow circulatingly through the primary winding 311, the diode D1, the capacitor C51, and the primary winding 311 in the order named.

It is to be noted that, at this occasion, on the secondary side of the transformers 31 and 32, the loop currents Ie1, Ie2, If1, Ik, and Io, and the output current Iout as illustrated in FIG. 7 may keep on flowing. This allows the load 7 to be driven.

Figure 9:
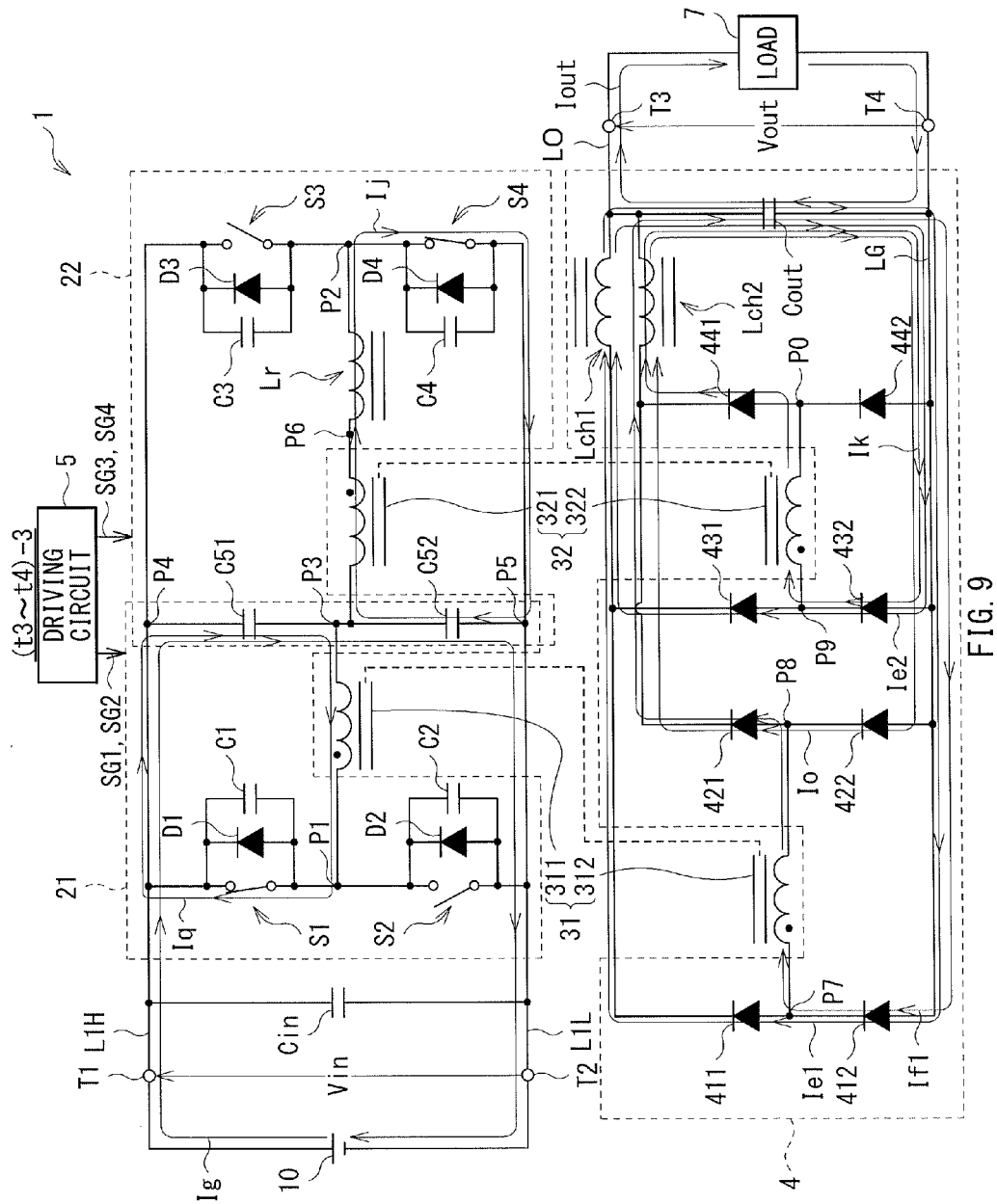
FIG. 9 is a circuit diagram of an example of an operation state following FIG. 8.

Subsequently, after the diode D1 becomes conductive as described, as illustrated in FIG. 9, the switching device S1 may be turned on ((A) of FIG. 2). This realizes the ZVS operation, resulting in reduction in the loss (the switching loss) in the switching device S1. At this occasion, as illustrated in FIG. 9, a loop current Iq flowing through the switching device S1 may flow, instead of the loop current Ip as illustrated in FIG. 8. The loop current Iq may flow circulatingly through the primary winding 311, the switching device S1, the capacitor C51, and the primary winding 311 in the order named.

As described, in the period from the timing t2 to the timing t3, the current flowing through the choke coil Lch2 may flow mainly through the secondary winding 312. In the period from the timing t3 to the timing t4, the following result arises. Since a voltage applied to the secondary winding 312 is eliminated, the current flowing through the choke coil Lch2 may be changed in destination from the secondary winding 312 to the secondary winding 322. However, since no current has been flowing through the secondary winding 322, no current (the current I321) has been flowing through the corresponding primary winding 321 ((C) of FIG. 2). It follows, therefore, that no currents have been flowing through the leakage inductance of the transformer 32 and the resonance inductor Lr. Accordingly, the current flowing through the choke coil Lch2 may be changed in destination from the secondary winding 312 to the secondary winding 322, while exciting the leakage inductance of the transformer 32 and the resonance inductor Lr. It is to be noted that discharge of the energy stored in the leakage inductance of the transformer 31 may cause energy to be stored in the leakage inductance of the transformer 32 and the resonance inductor Lr. This is the occasion on which the above-mentioned current may be changed in destination from the secondary winding 312 to the secondary winding 322, which corresponds to the timing t4 in FIG. 2.

(Timings t4 to t5)

Figure 10:
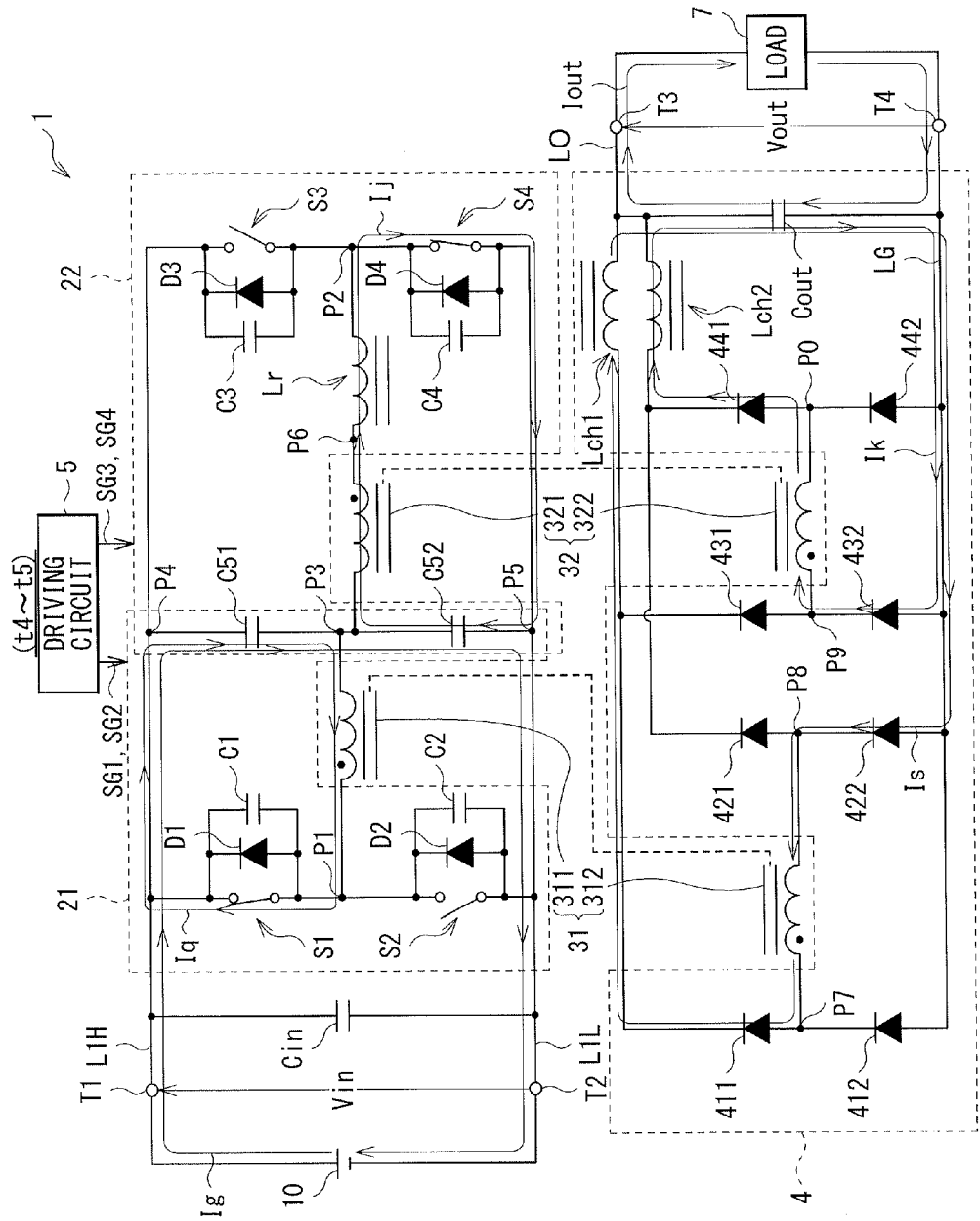
FIG. 10 is a circuit diagram of an example of an operation state following FIG. 9.

Next, as illustrated in FIG. 10, in a period from the timing t4 to the timing t5, it is as in the following. First, on the secondary side of the transformers 31 and 32, as illustrated in FIG. 10, a loop current Is may flow, instead of the loop currents Ie1, Ie2, If1, and Io as described so far. The loop current Is may flow circulatingly through the secondary winding 312, the rectifying diode 411, the choke coil Lch1, the output smoothing capacitor Cout, the rectifying diode 422, and the secondary winding 312 in the order named.

The period from the timing t4 to the timing t5 may serve as the power transmission period from the primary side to the secondary side of the transformers 31 and 32. It is to be noted that a period from the timing t4 to a timing t8 to be described later may serve as a power transmission period with use of the transformer 31.

At this occasion, in the transformer 31, the primary winding 311 may be in the "L" state on the connection point P3 side, and in the "H" state on the connection point P6 side. The secondary winding 312 may be in the "L" state on the connection point P8 side, and in the "H" state on the connection point P7 side. It follows, therefore, that a voltage |V312| given by (Vin/2)×(Ns1/Np1) may be generated between both ends of the secondary winding 312.

Meanwhile, in the transformer 32, the primary winding 321 may be in the "H" state on the connection point P3 side, and in the "L" state on the connection point P6 side. The secondary winding 322 may be in the "H" state on the connection point P0 side, and in the "L" state on the connection point P9 side. It follows, therefore, that a voltage |V322| given by (Vin/2)×(Ns2/Np2) may be generated between both ends of the secondary winding 322.

The high and low states (the "H" state and the "L" state) at both ends of each of the secondary windings 312 and 322 may be as described above. Accordingly, in the period from the timing t4 to the timing t5, the following result arises. The voltage V2 ((H) of FIG. 2) may be equal to |V322| (V2=|V322|), and that the voltage V1 ((H) of FIG. 2) may be equal to |V312| (V1=|V312|).

Thereafter, at the timing t5, the switching device S4 may be turned off ((B) of FIG. 2). As described, the operation for the first half cycle (from the timing t0 to the timing t5) may be terminated.

(B-2. Operation for Latter Half Cycle)

Description is given next on the operation for the latter half cycle (the timings t5 to t0), after the timings t0 to t5 as illustrated in FIG. 2.

The operation for the latter half cycle may be basically similar to the operation for the first half cycle (the timings t0 to t5) described with reference to FIGS. 2 to 10. As represented in parentheses in FIG. 2, the states at the timings t0, t1, t2, t3, and t4 may be respectively equivalent to those at the timings t5, t6, t7, t8, and t9. The relation of the switching device S2 (the capacitor C2, and the diode D2) to the switching device S4 (the capacitor C4, and the diode d4) in the operation in the first half cycle may be replaced with relation of the switching device S1 (the capacitor C1, and the diode D1) to the switching device S3 (the capacitor C3, and the diode d3) in the operation for the latter half cycle.

Accordingly, description on details of the operation for the latter half cycle is omitted. Here ends the description on the series of operation illustrated in FIG. 2.

(C. Workings and Effects)

As described, the switching power supply unit 1 according to the example embodiment may have the circuit configuration as illustrated in FIG. 1, and may perform the operation as illustrated in FIGS. 2 to 11. Hence, it is possible to obtain workings and effects as follows.

First, the driving circuit 5 may perform the switching drive to allow the two inverter circuits 21 and 22 to operate with the phase difference φ. The driving circuit 5 may control magnitude of the output voltage Vout by varying an excitation period in each of the two choke coils Lch1 and Lch2, in accordance with magnitude of the phase difference φ. It is to be noted that the excitation periods in the choke coils Lch1 and Lch2 may be respectively represented in FIG. 2 as the excitation periods ΔTch1 and ΔTch2. In other words, in this example, the excitation period ΔTch1 may correspond to a period from the timing t4 to the timing t0, i.e., a period of a composite duty (a logical OR) of the drive signals SG1 and SG3. The excitation period ΔTch2 may correspond to a period from the timing t9 to the timing t5, i.e., a period of a composite duty (a logical OR) of the drive signals SG2 and SG4.

Here, as illustrated in FIG. 2, the switching drive may be performed, with a phase difference of 180°, on the two switching devices S1 and S2 in the inverter circuit 21. Also, the switching drive may be performed, with a phase difference of 180°, on the two switching devices S3 and S4 in the inverter circuit 22. Furthermore, as described, the two inverter circuits 21 and 22 may be also driven to operate with the phase difference φ, for example, as illustrated in FIG. 2.

Controlling the phase difference φ, therefore, makes it possible to change a time ratio, i.e., an excitation duty, of the excitation periods ΔTch1 and ΔTch2 as described. This allows for adjustment of the magnitude of the output voltage Vout. Specifically, increasing the phase difference ϕ may be equivalent to lengthening a superposition period of the drive signals SG1 and SG4, and lengthening a superposition period of the drive signals SG2 and SG3. In other words, increasing the phase difference ϕ may be equivalent to lengthening the time ratio of the excitation periods ΔTch1 and ΔTch2 as described.

Moreover, in the example embodiment, for example, the driving circuit 5 may perform the switching drive to allow durations of the on-duty periods of the switching devices S1 to S4 to be substantially maximum (or to be maximum in a preferred but non-limiting example), in the inverter circuits 21 and 22.

Here, as described above, in an off-duty period in which no power transmission by the transformers 31 and 32 is performed, generation of a circulating current (e.g., the loop currents Ic, Id, Il, and Im) with use of the LC resonance operation may achieve the ZVS operation when the switching device is turned on. However, the circulating current necessary for the ZVS operation exists in the off-duty period. This may cause an increased loss in electrical power as the off-duty period becomes longer, resulting in lowered power conversion efficiency.

In the example embodiment, as described, in the inverter circuits 21 and 22, the switching drive may be performed to allow durations of the on-duty periods of the switching devices S1 to S4 to be substantially maximum. This allows the off-duty periods to be limited to a short time, i.e., the dead time as described above (e.g., the period from the timing t0 to the timing t1, the period from the timing t3 to the timing t4, the period from the timing t5 to the timing t6, and the period from the timing t8 to the timing t9). Hence, it is possible to minimize generation of the circulating current necessary for the ZVS operation. Consequently, a power loss due to the circulating current flowing through the body diodes (the diodes D1 to D4) of the switching devices S1 to S4 may be also minimized, leading to enhancement in power conversion efficiency. It is to be noted that, in a preferred but non-limiting example, the durations of the on-duty periods of the switching devices S1 to S4 may be substantially maximum in order to reduce the power loss due to the circulating current; however, the operation is not hindered even when the durations of the on-duty periods are not substantially maximum.

As described, in the example embodiment, the switching power supply unit 1 may have the circuit configuration as illustrated in FIG. 1, and the operation as illustrated in FIGS. 2 to 10 may be performed. Hence, it is possible to minimize the generation of the circulating current necessary for the ZVS operation. This results in reduction in a conduction loss that does not contribute to power transmission in the switching devices S1 to S4, making it possible to facilitate enhancement in power transmission efficiency.

The reduction in the loss also makes it possible to use a device having a smaller rating, allowing for reduction in costs. Furthermore, the reduction in the loss causes reduction in heat generation in the switching devices S1 to S4. Hence, it is possible to relieve requests for performance of a heat dissipation insulating plate to attain both heat dissipation and insulation. In this viewpoint as well, it is therefore possible to reduce costs.

2. Modification Examples

Description is given next on modification examples (modification examples 1 to 4) of the forgoing example embodiment. It is to be noted that, in the modification examples in the following, similar components to those of the example embodiment are denoted by similar references, and description thereof is omitted.

Modification Example 1

A. Configuration

Figure 11:
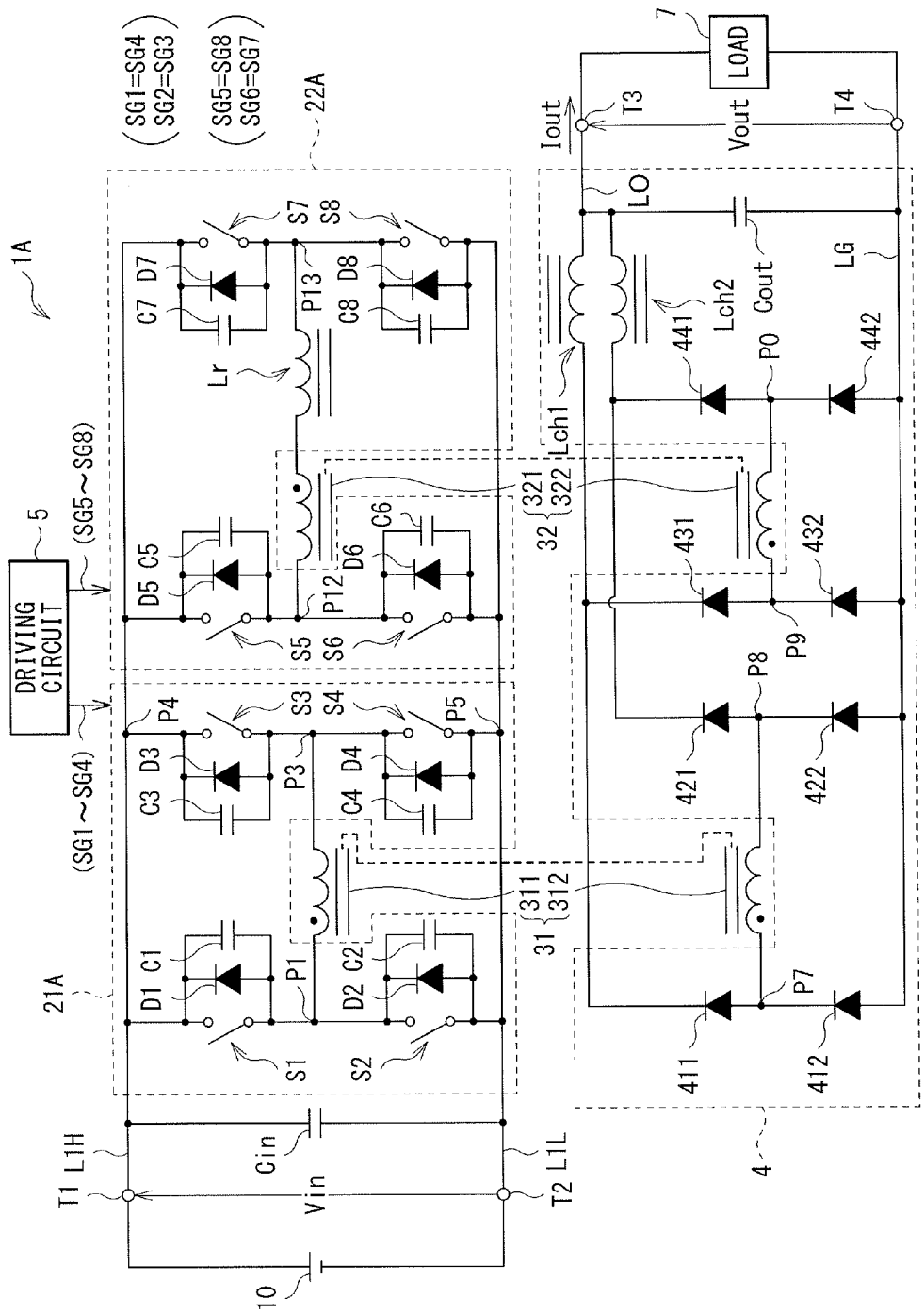
FIG. 11 is a circuit diagram of an example of an overall configuration of a switching power supply unit according to a modification example 1.

FIG. 11 illustrates, in a form of a circuit diagram, an example of an overall configuration of a switching power supply unit (a switching power supply unit 1A) according to a modification example 1.

The switching power supply unit 1A according to the modification example may be provided with inverter circuits 21A and 22A that each include a full-bridge circuit, instead of the inverter circuits 21 and 22 that each include a half-bridge circuit. It is to be noted that the inverter circuits 21A and 22A are provided in parallel to one another between the input terminals T1 and T2, and the primary windings 311 and 321, similarly to the inverter circuits 21 and 22.

(Inverter Circuits 21A and 22A)

The inverter circuit 21A may include the four switching devices S1 to S4, the capacitors C1 to C4, and the diodes D1 to D4. The capacitors C1 to C4 and the diodes D1 to D4 may be respectively coupled in parallel to the switching devices S1 to S4. The inverter circuit 22A may include four switching devices S5 to S8, capacitors C5 to C8, diodes D5 to D8, and the resonance inductor Lr. The capacitors C5 to C8 and the diodes D5 to D8 may be respectively coupled in parallel to the switching devices S5 to S8. It is to be noted that the diodes D1 to D8 each may include a cathode disposed on the primary high-voltage line L1H side, and an anode disposed on the primary low-voltage line L1L. In other words, the diodes D1 to D8 may be in the backward-coupled state.

In the inverter circuit 21A, the first ends of the switching devices S1 and S2, the first ends of the capacitors C1 and C2, the anode of the diode D1, and the cathode of the diode D2 may be coupled together at the connection point P1. The first ends of the switching devices S3 and S4, the first ends of the capacitors C3 and C4, the anode of the diode D3, and the cathode of the diode D4 may be coupled together at the connection point P3. The second ends of the switching devices S1 and S3, the second ends of the capacitors C1 and C3, and the cathodes of the diodes D1 and D3 may be coupled together at the connection point P4 on the primary high-voltage line L1H. The second ends of the switching devices S2 and S4, the second ends of the capacitors C2 and C4, and the anodes of the diodes D2 and D4 may be coupled together at the connection point P5 on the primary low-voltage line L1L. Between the connection points P1 and P3, the primary winding 311 of the transformer 31 may be inserted. With this configuration, in the inverter circuit 21A, the switching devices S1 to S4 may be respectively turned on and off in accordance with the drive signals SG1 to SG4 supplied from the driving circuit 5. This allows the direct-current input voltage Vin to be converted to an alternating-current voltage, and the alternating-current voltage thus converted may be outputted. It is to be noted that, as illustrated in FIG. 11, the drive signal SG1 and the drive signal SG4 may be same signals as one another, while the drive signal SG2 and the drive signal SG3 may be same signals as one another.

In the inverter circuit 22A, first ends of the switching devices S5 and S6, first ends of the capacitors C5 and C6, the anode of the diode D5, and the cathode of the diode D6 may be coupled together at a connection point P12. First ends of the switching devices S7 and S8, first ends of the capacitors C7 and C8, the anode of the diode D7, and the cathode of the diode D8 may be coupled together at a connection point P13. Second ends of the switching devices S5 and S7, second ends of the capacitors C5 and C7, and the cathodes of the diodes D5 and C7 may be coupled together at the connection point P4. Second ends of the switching devices S6 and S8, second ends of the capacitors C6 and C8, and the anodes of the diodes D6 and D8 may be coupled together at the connection point P5. Between the connection points P12 and P13, the primary winding 321 of the transformer 32 and the resonance inductor Lr may be inserted in a serially-coupled state. In one specific but non-limiting example, the first end of the primary winding 321 may be coupled to the connection point P12; the second end of the primary winding 321 and the first end of the resonance inductor Lr may be coupled together; the second end of the resonance inductor Lr may be coupled to the connection point P13. With this configuration, in the inverter circuit 22A, the switching devices S5 to S8 may be respectively turned on and off in accordance with the drive signals SG5 to SG8 supplied from the driving circuit 5. This allows the direct-current input voltage Vin to be converted to an alternating-current voltage, and the alternating-current voltage thus converted may be outputted. It is to be noted that, as illustrated in FIG. 11, the drive signal SG5 and the drive signal SG8 may be same signals as one another, and the drive signal SG6 and the drive signal SG7 may be same signals as one another.

It is to be noted that each of the switching devices S1 to S8 may include a switching device such as a MOS-FET and an IGBT, similarly to the forgoing description. With MOS-FETs used as the switching devices S1 to S8, the capacitors C1 to C8 and the diodes D1 to D8 may be configured of parasitic capacitances and parasitic diodes of the respective MOS-FETs. In another alternative, the capacitors C1 to C8 may be configured of junction capacitances of the respective diodes D1 to D8. With such configurations, it is not necessary to provide the capacitors C1 to C8 and the diodes D1 to D8 separately from the switching devices S1 to S8. This allows for simplification of the circuit configuration of the inverter circuits 21A and 22A.

B. Operation, Workings, and Effects

Figure 12:
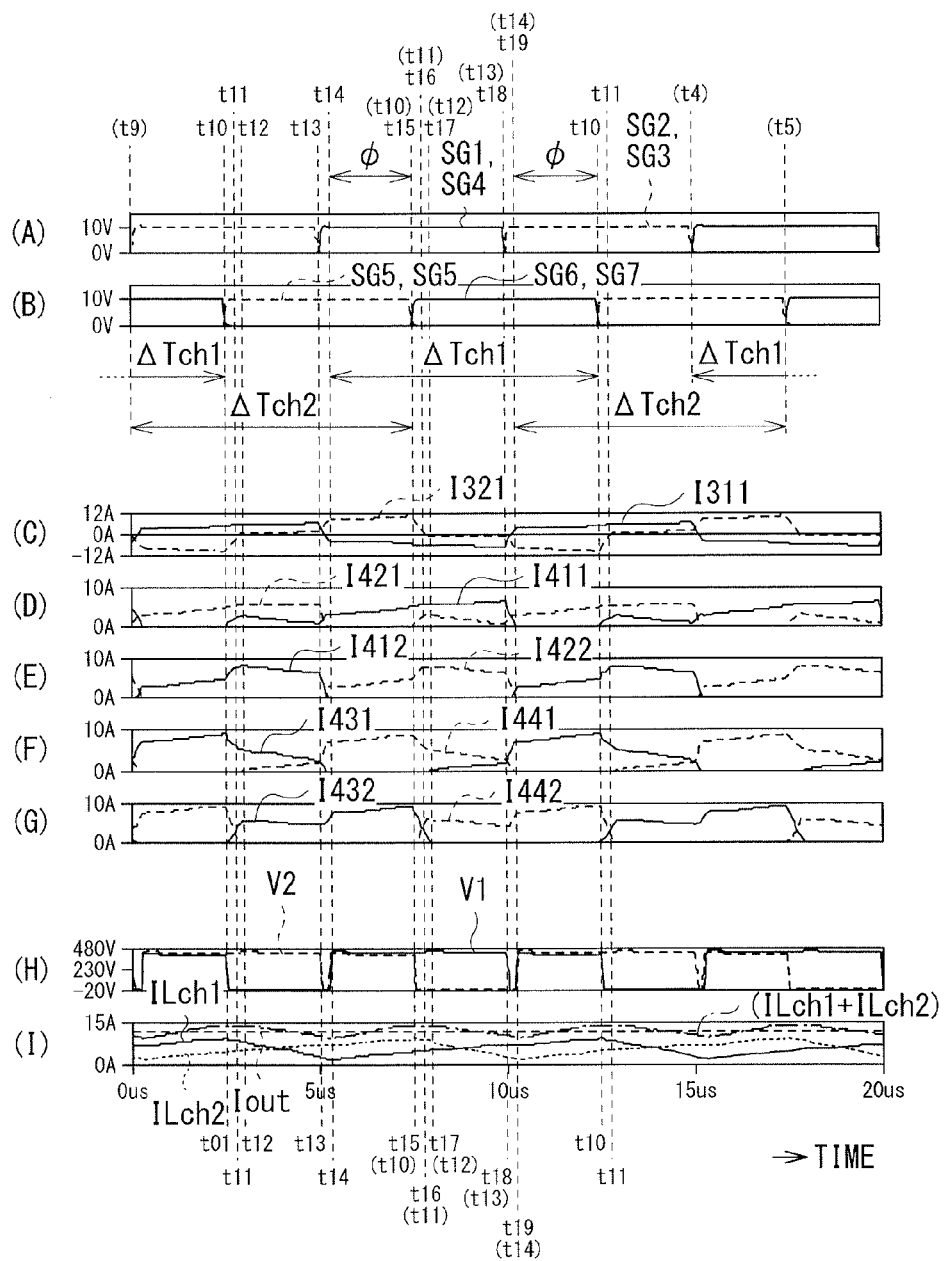
FIG. 12 is a timing waveform chart of an example of operation of the switching power supply unit illustrated in FIG. 11.

FIG. 12 illustrates, in a form of a timing waveform chart, a voltage waveform or a current waveform in each section of the switching power supply unit 1A, in a similar manner to FIG. 2 as described above. Specifically, (A) and (B) of FIG. 12 illustrate voltage waveforms of the drive signals SG1 to SG8. (C) to (G) of FIG. 12 illustrate current waveforms of the currents I311 and I321 respectively flowing through the primary windings 311 and 321, and the currents I411, I412, I421, I422, I431, I432, I441, and I442 respectively flowing through the rectifying diodes 411, 412, 421, 422, 431 432, 441, and 442. (H) of FIG. 12 illustrate voltage waveforms of the voltages V1 and V2 as described. (I) of FIG. 12 illustrates current waveforms of the currents ILch1 and ILch2, the current (ILch1+ILch2), and the output current Iout as described. It is to be noted that the positive directions of the voltages and the currents may be denoted by the arrows in FIG. 1.

The switching power supply unit 1A may therefore operate basically in a similar manner to the switching power supply unit 1, making it possible to obtain basically similar workings and thereby obtain similar effects.

It is to be noted, as described above, the drive signal SG1 and the drive signal SG4 may be the same signals as one another, while the drive signal SG2 and the drive signal SG3 may be the same signals as one another. Similarly, the drive signal SG5 and the drive signal SG8 may be the same signals as one another, and the drive signal SG6 and the drive signal SG7 may be the same signals as one another. Timings t10 to t19 as illustrated in FIG. 12 may respectively correspond to the timings t0 to t9 in the forgoing example embodiment as illustrated in FIG. 2. Similarly, timings t15 to t19 as illustrated in FIG. 12 may respectively correspond to the timings t10 to t14 as illustrated in FIG. 2. Accordingly, the drive signals SG1 and SG4 as illustrated in FIG. 12 may correspond to the drive signal SG1 as illustrated in FIG. 2, and the drive signals SG2 and SG3 as illustrated in FIG. 12 may correspond to the drive signal SG2 as illustrated in FIG. 2. Similarly, the drive signals SG6 and SG7 as illustrated in FIG. 12 may correspond to the drive signal SG3 as illustrated in FIG. 2, and the drive signals SG5 and SG8 as illustrated in FIG. 12 may correspond to the drive signal SG4 as illustrated in FIG. 2.

Assume that the number of winding turns of the primary windings 311 and 321 in the modification example be represented as Npf, and the number of winding turns of the primary windings 311 and 321 in the forgoing example embodiment be represented as Nph. Then, the following relation may be established: (Npf/Nph)=2. The following, therefore, can be said. First, with magnitude of the load 7 being equal, a current flowing through the switching devices S1 to S8 according to the modification example is about a half in magnitude of a current flowing through the switching devices S1 to S4 according to the forgoing example embodiment. Next, a voltage applied to the transformers 31 and 32 is (Vin/2) in the forgoing example embodiment, and Vin in the modification example. It follows, therefore, that the switching power supply units 1 and 1A may become equivalent to one another by allowing the numbers of winding turns of the secondary windings 321 and 322 to be equal to one another, and by allowing the above-described relation: (Npf/Nph)=2 to be satisfied.

It is to be noted that, in the switching power supply unit 1A according to the modification example, an output voltage control with use of a phase difference between arms inside each of the inverter circuits 21A and 22A may be also used, in addition to the output voltage control with use of the phase difference φ between the inverter circuits (between the inverter circuits 21A and 22A in this modification example). This may however cause a longer duration of a period of the generation of the circulating current used for the ZVS operation as described. This may be therefore less effective in reducing the power loss (or in enhancing the power transmission efficiency) as described in the forgoing example embodiment.

Modification Example

Figure 13:
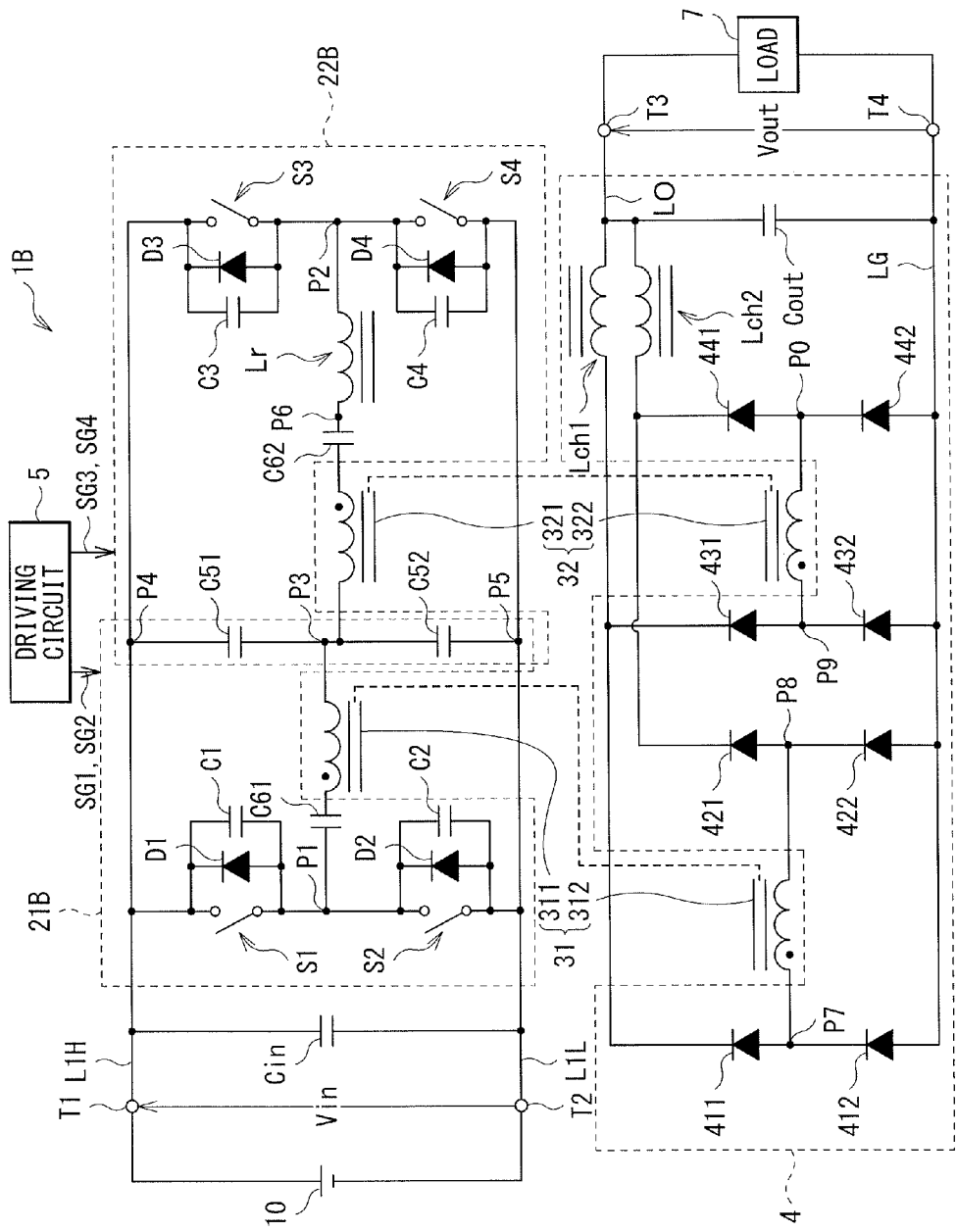
FIG. 13 is a circuit diagram of an example of an overall configuration of a switching power supply unit according to a modification example 2.

FIG. 13 illustrates, in a form of a circuit diagram, an example of an overall configuration of a switching power supply unit (a switching power supply unit 1B) according to a modification example 2.

The switching power supply unit 1B according to the modification example may be provided with inverter circuits 21B and 22B, instead of the inverter circuits 21 and 22 as in the switching power supply unit 1 according to the forgoing example embodiment.

The inverter circuits 21B and 22B may be respectively provided with capacitors adapted to prevent biased excitation, i.e., capacitors C61 and C62. In one specific but non-limiting example, in the inverter circuit 21B, the capacitor C61 may be inserted between the connection point P1 and the primary winding 311 of the transformer 31. In the inverter circuit 22B, the capacitor C62 may be inserted between the connection point P6 and the primary winding 321 of the transformer 32.

With this configuration, in the switching power supply unit 1B, it is possible to restrain (or prevent in a preferred but non-limiting example) biased excitation in the transformer 31 and 32, and to avoid various inconveniences due to the biased excitation.

It is to be noted that the switching power supply unit 1A as described in the modification example 1 may be also provided with the capacitors C61 and C62, similarly to the modification example.

Modification Example 3

Figure 14:
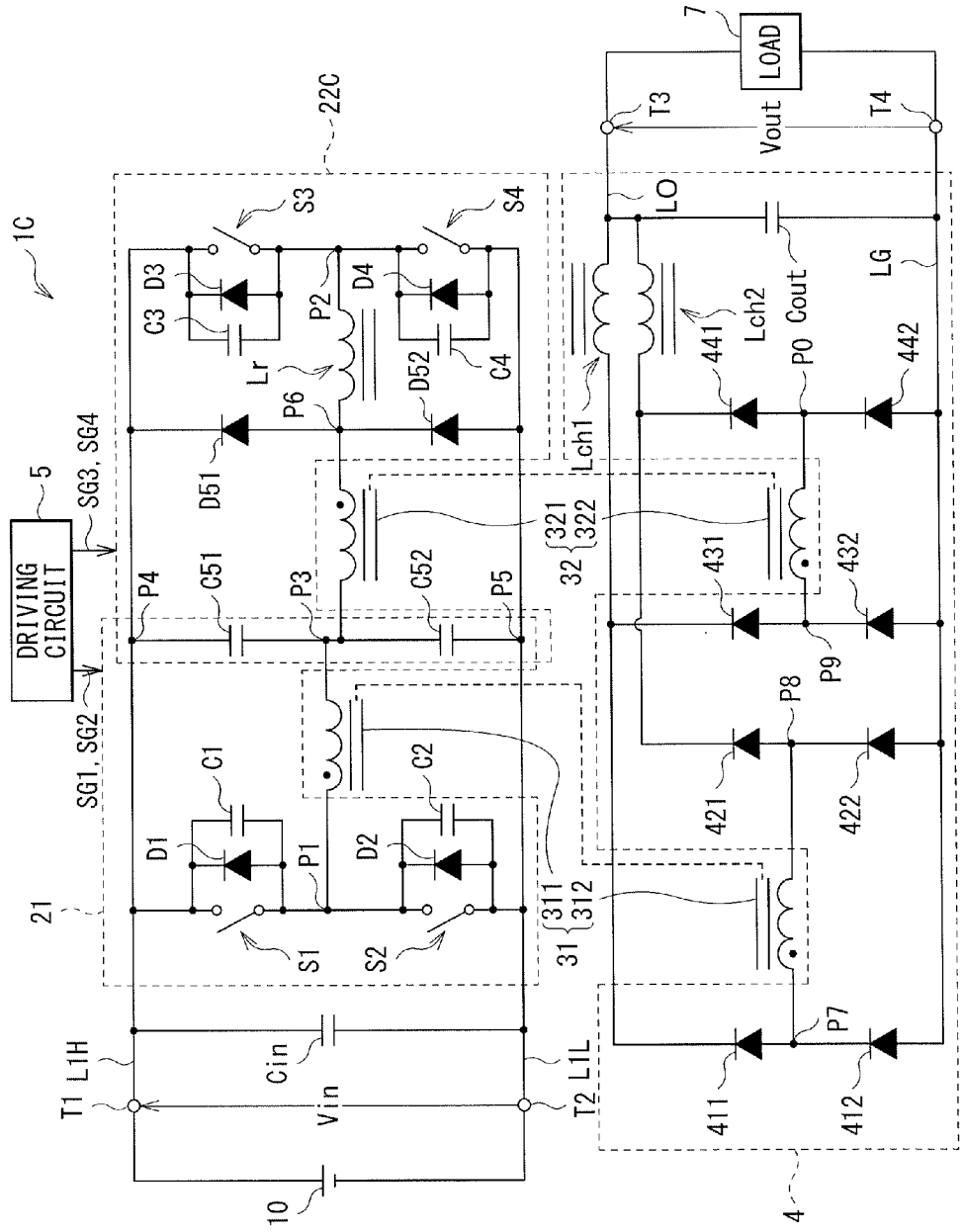
FIG. 14 is a circuit diagram of an example of an overall configuration of a switching power supply unit according to a modification example 3.

FIG. 14 illustrates, in a form of a circuit diagram, an example of an overall configuration of a switching power supply unit (a switching power supply unit 1C) according to the modification example 3.

The switching power supply unit 1C may be provided with an inverter circuit 22C as described below, instead of the inverter circuit 22 as in the switching power supply unit 1 according to the forgoing example embodiment.

The inverter circuit 22C may be provided with rectifying devices that may serve as reverse voltage clamps, i.e., diodes D51 and D52. In one specific but non-limiting example, the diode D51 may include an anode coupled to the connection point P6, and a cathode coupled to the primary high-voltage line L1H (the connection point P4). The diode D52 may include an anode coupled to the primary low-voltage line L1L (the connection point P5), and a cathode coupled to the connection point P6. In other words, the diodes D51 and D52 may be provided between the primary high-voltage line L1H and the primary low-voltage line L1L, and may be coupled in series to one another through the connection point P6.

With this configuration, in the switching power supply unit 1C, it is possible to restrain generation of a surge voltage accompanying the on and off operations of the switching devices S1 to S4. Hence, it is possible to reduce the loss in the rectifying diodes 411, 412, 421, 422, 431, 432, 441, and 442 inside the rectifying smoothing circuit 4.

It is to be noted that the switching power supply units 1A and 1B may be also provided with the diodes D51 and D52 that may serve as reverse voltage clamps, similarly to the modification example.

Modification Example 4

Figure 15:
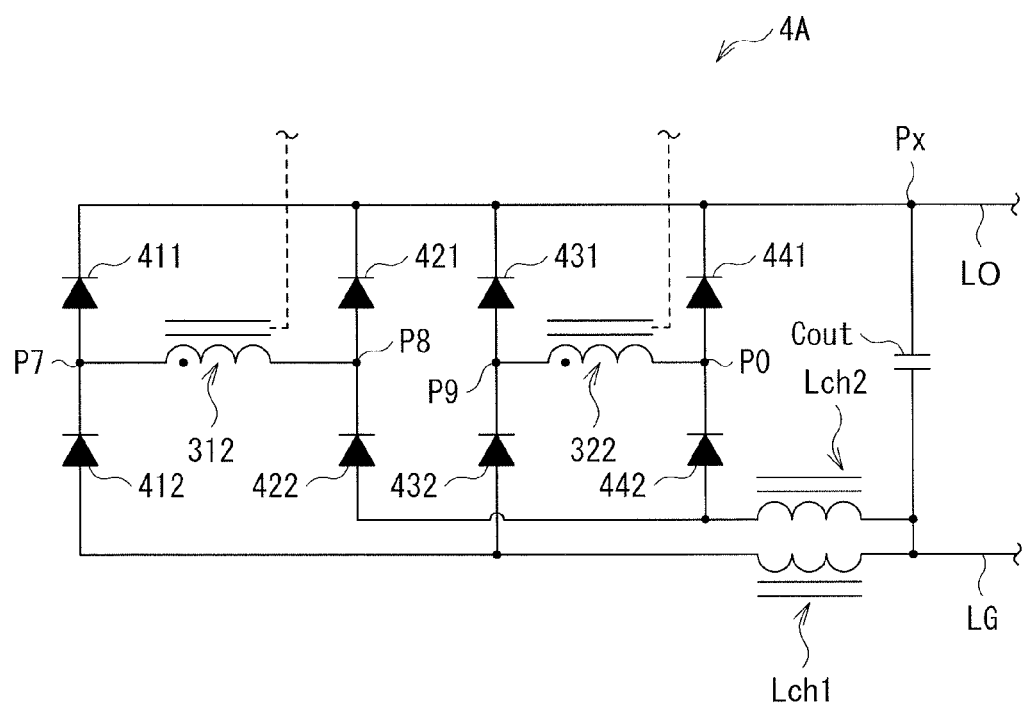
FIG. 15 is a circuit diagram of an example of a configuration of a rectifying smoothing circuit according to a modification example 4.

FIG. 15 illustrates an example of a circuit configuration of a rectifying smoothing circuit (a rectifying smoothing circuit 4A) according to a modification example 4. In the rectifying smoothing circuit 4A according to the modification example may be different from the rectifying smoothing circuit 4 as described so far, in an arrangement of the choke coils Lch1 and Lch2, and in coupling relation of the rectifying diodes 411, 412, 421, 422, 431, 432, 441, and 442, and the choke coils Lch1 and Lch2.

In one specific but non-limiting example, in the rectifying smoothing circuit 4A, the connection point of the first ends of the first arms in the first and the second full-bridge rectifying circuits as described may be coupled to the first end of the choke coil Lch1 disposed on the ground line LG from the output terminal T4. The connection point of the second ends of the first arms may be coupled to the output line LO extended from the output terminal T3. The connection point of the first ends of the second arms in the first and the second full-bridge rectifying circuits as described may be coupled to the first end of the choke coil Lch2 disposed on the ground line LG from the output terminal T4. The connection point of the second ends of the second arms may be coupled to the output line LO.

Here, in the first arm in the first full-bridge rectifying circuit, the cathodes of the rectifying diodes 411 and 412 may be disposed on side on which the second end of the first arm is disposed. The anodes of the rectifying diodes 411 and 412 may be disposed on side on which the first end of the first arm is disposed. In one specific but non-limiting example, the anode of the rectifying diode 412 may be coupled to side of the choke coil Lch1 on which the first end of the first arm is disposed. The anode of the rectifying diode 411 and the cathode of the rectifying diode 412 may be coupled together at the connection point P7. The cathode of the rectifying diode 411 may be coupled to the output line LO. Meanwhile, in the second arm in the first full-bridge rectifying circuit, the cathodes of the rectifying diodes 421 and 422 may be disposed on side on which the second end of the second arm is disposed. The anodes of the rectifying diodes 421 and 422 may be disposed on side on which the first end of the second arm is disposed. In one specific but non-limiting example, the anode of the rectifying diode 422 may be coupled to side of the choke coil Lch2 on which the first end of the second arm is disposed. The anode of the rectifying diode 421 and the cathode of the rectifying diode 422 may be coupled together at the connection point P8. The cathode of the rectifying diode 421 may be coupled to the output line LO.

Similarly, in the first arm in the second full-bridge rectifying circuit, the cathodes of the rectifying diodes 431 and 432 may be disposed on side on which the second end of the first arm is disposed. The anodes of the rectifying diodes 431 and 432 may be disposed on side on which the first end of the first arm is disposed. In one specific but non-limiting example, the anode of the rectifying diode 432 may be coupled to side of the choke coil Lch1 on which the first end of the first arm is disposed. The anode of the rectifying diode 431 and the cathode of the rectifying diode 432 may be coupled together at the connection point P9. The cathode of the rectifying diode 431 may be coupled to the output line LO. Meanwhile, in the second arm in the second full-bridge rectifying circuit, the cathodes of the rectifying diodes 441 and 442 may be disposed on side on which the second end of the second arm is disposed. The anodes of the rectifying diodes 441 and 442 may be disposed on side on which the first end of the second arm is disposed. In one specific but non-limiting example, the anode of the rectifying diode 442 may be coupled to side of the choke coil Lch2 on which the first end of the second arm is disposed. The anode of the rectifying diode 441 and the cathode of the rectifying diode 442 may be coupled together at the connection point P0. The cathode of the rectifying diode 441 may be coupled to the output line LO.

Moreover, the secondary windings 312 and 322 in the respective transformers 31 and 32 each may be coupled to corresponding one of the first and the second full-bridge rectifying circuits to form the H-bridge coupling to the corresponding one of the first and the second full-bridge rectifying circuits. In one specific but non-limiting example, the secondary winding 312 of the transformer 31 may be coupled to the first full-bridge rectifying circuit to form the H-bridge coupling to the first full-bridge rectifying circuit. Also, the secondary winding 322 of the transformer 32 may be coupled to the second full-bridge rectifying circuit to form the H-bridge coupling to the second full-bridge rectifying circuit. In one more specific but non-limiting example, the secondary winding 312 may be inserted between the connection points P7 and P8 in the first full-bridge rectifying circuit, while the secondary winding 322 may be inserted between the connection points P9 and P0 in the second full-bridge rectifying circuit.

Furthermore, the connection point of the second ends of the choke coils Lch1 and Lch2 may be coupled to the first end of the output smoothing capacitor Cout. In the first and the second full-bridge rectifying circuits, the connection point of the second ends of the first arms and the connection point of the second ends of the second arms each may be coupled to the second end of the output smoothing capacitor Cout.

As described, various implementations may be adopted as a configuration (e.g., an arrangement of devices and their coupling relation) inside the rectifying smoothing circuit.

3. Other Modification Examples

Although the invention has been described in the foregoing by way of example with reference to the example embodiments and the modification examples, the technology of the invention is not limited thereto but may be modified in a wide variety of ways.

For example, in the example embodiments and the modification examples, description has been given on specific configurations of the inverter circuits. However, the configurations of the inverter circuits are not limited thereto, and other configurations may be adopted. Specifically, in the example embodiments and the modification examples, described is an example with the switching power supply unit that includes the inverter circuits having a common configuration such as a case in which the inverter circuits each include a half-bridge circuit including two switching devices, and a case in which the inverter circuits each include a full-bridge circuit including four switching devices. However, this is illustrative and non-limiting. The switching power supply unit may include the inverter circuits having different configurations. For example, one of the inverter circuits may include a half-bridge circuit including two switching devices, while another of the inverter circuits may include a full-bridge circuit including four switching devices.

Moreover, in the example embodiments and the modification examples, description has been given on specific configurations of the rectifying smoothing circuit. However, the configurations of the rectifying smoothing circuit are not limited thereto, and other configurations may be adopted. Specifically, for example, the rectifying devices in the rectifying smoothing circuit each may include a parasitic diode of a MOS-FET. In this case, in a preferred but non-limiting example, the MOS-FET itself may be turned on, in synchronization with a period in which the parasitic diode of the MOS-FET becomes conductive (that is, the MOS-FET may perform synchronous rectification). This allows for rectification with a smaller voltage drop. It is to be noted that, in this case, anode side of the parasitic diode may be disposed on source side of the MOS-FET, while cathode side of the parasitic diode may be disposed on drain side of the MOS-FET.

Furthermore, in the example embodiments and the modification examples as described above, the number of the inverter circuits, the number of the transformers, the number of the rectifying devices, and the number of the arms are not limited to physical numbers, but may refer to the numbers of those present in an equivalent circuit.

In addition, in the example embodiments and the modification examples, description has been given on an example of a DC-DC converter as an example of the switching power supply unit according to the embodiment of the invention. However, any embodiment of the invention may be applied to other kinds of switching power supply unit such as an AC-DC converter.

Moreover, the invention encompasses any possible combination of some or all of the various embodiments and the modification examples described herein and incorporated herein.

It is possible to achieve at least the following configurations from the above-described example embodiments and the modification examples of the disclosure.

(1) A switching power supply unit, including:
a pair of input terminals configured to receive an input voltage;
a pair of output terminals configured to output an output voltage;
two transformers each having a primary winding and a secondary winding;
two inverter circuits provided in parallel to one another between the pair of input terminals and the primary windings, and each having one or more switching devices;
a rectifying smoothing circuit provided between the pair of output terminals and the secondary windings, and including eight rectifying devices, a first choke coil, a second choke coil, and a capacitance provided between the pair of output terminals, wherein
two full-bridge rectifying circuits are provided that each include two arms, the two arms each having two of the eight rectifying devices that are provided in series to one another in a same direction,
the secondary windings of the respective two transformers are each coupled to corresponding one of the two full-bridge rectifying circuits to form an H-bridge coupling to the corresponding one of the two full-bridge rectifying circuits,
a first connection point is coupled to a first end of the first choke coil and a second connection point is coupled to a first end of the second choke coil, the first connection point being a connection point that couples together first ends of respective first arms, the second connection point being a connection point that couples together first ends of respective second arms, the first arms each being an arm that is corresponding one of the two arms in each of the two full-bridge rectifying circuits, and the second arms each being an arm that is corresponding another one of the two arms in each of the two full-bridge rectifying circuits,
a third connection point is coupled to a first end of the capacitance, the third connection point being a connection point that couples together second ends of the respective first and second choke coils, and
a fourth connection point and a fifth connection point are coupled to a second end of the capacitance, the fourth connection point being a connection point that couples together second ends of the respective first arms in the respective two full-bridge rectifying circuits, and the fifth connection point being a connection point that couples together second ends of the respective second arms in the respective two full-bridge rectifying circuits; and a driver configured to perform a switching drive that controls operation of the one or more switching devices of the respective two inverter circuits.

(2) The switching power supply unit according to (1), wherein in each of the first arm and the second arm in each of the two full-bridge rectifying circuits, each of the two of the eight rectifying devices includes:

a cathode disposed on side on which the first end of corresponding one of the first arm and the second arm is disposed; and an anode disposed on side on which the second end of the corresponding one of the first arm and the second arm is disposed.

(3) The switching power supply unit according to (1), wherein in each of the first arm and the second arm in each of the two full-bridge rectifying circuits, each of the two of the eight rectifying devices includes:

a cathode disposed on side on which the second end of corresponding one of the first arm and the second arm is disposed; and an anode disposed on side on which the first end of the corresponding one of the first arm and the second arm is disposed.

(4) The switching power supply unit according to any one of (1) to (3), wherein the eight rectifying devices each include a patristic diode of a field effect transistor.

(5) The switching power supply unit according to any one of (1) to (4), wherein the one or more switching devices include two or more switching devices, and the two inverter circuits each include one of a half-bridge circuit and a full-bridge circuit, the half-bridge circuit including two of the two or more switching devices, and the full-bridge circuit including four of the two or more switching devices.

(6) The switching power supply unit according to any one of (1) to (5), wherein the driver performs the switching drive to allow the two inverter circuits to operate with a phase difference.

(7) The switching power supply unit according to (6), wherein the driver controls magnitude of the output voltage by varying an excitation period in each of the first and the second choke coils in accordance with magnitude of the phase difference.

(8) The switching power supply unit according to (7), wherein the driver performs the switching drive to allow durations of on-duty periods of the one or more switching devices to be substantially maximum, in each of the two inverter circuits.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A switching power supply unit, comprising:
    a pair of input terminals configured to receive an input voltage;
    a pair of output terminals configured to output an output voltage;
    two transformers each having a primary winding and a secondary winding;
    two inverter circuits provided in parallel to one another between the pair of input terminals and the primary windings, and each having one or more switching devices;
    a rectifying smoothing circuit provided between the pair of output terminals and the secondary windings, and including eight rectifying devices, a first choke coil, a second choke coil, and a capacitance provided between the pair of output terminals, wherein
    two full-bridge rectifying circuits are provided that each include two arms, the two arms each having two of the eight rectifying devices that are provided in series to one another in a same direction,
    the secondary windings of the respective two transformers are each coupled to corresponding one of the two full-bridge rectifying circuits to form an H-bridge coupling to the corresponding one of the two full-bridge rectifying circuits,
    a first connection point is coupled to a first end of the first choke coil and a second connection point is coupled to a first end of the second choke coil, the first connection point being a connection point that couples together first ends of respective first arms, the second connection point being a connection point that couples together first ends of respective second arms, the first arms each being an arm that is corresponding one of the two arms in each of the two full-bridge rectifying circuits, and the second arms each being an arm that is corresponding another one of the two arms in each of the two full-bridge rectifying circuits,
    a third connection point is coupled to a first end of the capacitance, the third connection point being a connection point that couples together second ends of the respective first and second choke coils, and
    a fourth connection point and a fifth connection point are coupled to a second end of the capacitance, the fourth connection point being a connection point that couples together second ends of the respective first arms in the respective two full-bridge rectifying circuits, and the fifth connection point being a connection point that couples together second ends of the respective second arms in the respective two full-bridge rectifying circuits; and
    a driver configured to perform a switching drive that controls operation of the one or more switching devices of the respective two inverter circuits.

2. The switching power supply unit according to claim 1, wherein in each of the first arm and the second arm in each of the two full-bridge rectifying circuits,
each of the two of the eight rectifying devices includes:
a cathode disposed on side on which the first end of corresponding one of the first arm and the second arm is disposed; and
an anode disposed on side on which the second end of the corresponding one of the first arm and the second arm is disposed.

3. The switching power supply unit according to claim 1, wherein
in each of the first arm and the second arm in each of the two full-bridge rectifying circuits,
each of the two of the eight rectifying devices includes:
a cathode disposed on side on which the second end of corresponding one of the first arm and the second arm is disposed; and
an anode disposed on side on which the first end of the corresponding one of the first arm and the second arm is disposed.

4. The switching power supply unit according to claim 1, wherein
the eight rectifying devices each comprise a parasitic diode of a field effect transistor.

5. The switching power supply unit according to claim 1, wherein
the one or more switching devices include two or more switching devices, and
the two inverter circuits each comprise one of a half-bridge circuit and a full-bridge circuit, the half-bridge circuit including two of the two or more switching devices, and the full-bridge circuit including four of the two or more switching devices.

6. The switching power supply unit according to claim 1, wherein
the driver performs the switching drive to allow the two inverter circuits to operate with a phase difference.

7. The switching power supply unit according to claim 6, wherein
the driver controls magnitude of the output voltage by varying an excitation period in each of the first and the second choke coils in accordance with magnitude of the phase difference.

8. The switching power supply unit according to claim 7, wherein
the driver performs the switching drive to allow durations of on-duty periods of the one or more switching devices to be substantially maximum, in each of the two inverter circuits.

* * * * *